(12) United States Patent
Snider et al.

(10) Patent No.: US 12,403,750 B2
(45) Date of Patent: Sep. 2, 2025

(54) GLASS ROOF PANEL ASSEMBLY FOR VEHICLE ROOF

(71) Applicant: Magna Mirrors of America, Inc., Holland, MI (US)

(72) Inventors: Darin J. Snider, Holland, MI (US); Kyle S. Bowman, Holland, MI (US); Steven P. Goodwin, Pullman, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 465 days.

(21) Appl. No.: 17/823,101

(22) Filed: Aug. 30, 2022

(65) Prior Publication Data

US 2023/0070479 A1 Mar. 9, 2023

Related U.S. Application Data

(60) Provisional application No. 63/366,940, filed on Jun. 24, 2022, provisional application No. 63/365,800, filed on Jun. 3, 2022, provisional application No. 63/363,206, filed on Apr. 19, 2022, provisional application No. 63/260,970, filed on Sep. 8, 2021.

(51) Int. Cl.
*B60J 7/16* (2006.01)
*B60J 1/00* (2006.01)

(52) U.S. Cl.
CPC ............... *B60J 1/008* (2013.01); *B60J 1/006* (2013.01); *B60J 7/1621* (2013.01)

(58) Field of Classification Search
CPC .......... B60J 1/008; B60J 1/006; B60J 7/1621
USPC ..................................................... 296/146.1
See application file for complete search history.

(56) References Cited

U.S. PATENT DOCUMENTS

| 4,095,841 | A | * | 6/1978 | Thompson | B60J 7/106 |
| | | | | | 296/218 |
| 4,330,150 | A | * | 5/1982 | Dunchock | B60J 7/11 |
| | | | | | 296/218 |
| 5,551,197 | A | | 9/1996 | Repp et al. | |
| 5,799,444 | A | | 9/1998 | Freimark et al. | |
| 5,853,895 | A | | 12/1998 | Lewno | |
| 5,996,284 | A | | 12/1999 | Freimark et al. | |
| 6,026,611 | A | | 2/2000 | Ralston et al. | |

(Continued)

FOREIGN PATENT DOCUMENTS

| DE | 102021116405 A1 * 12/2021 | ............. B60J 10/21 |
| KR | 19990003124 U * 1/1999 | |

OTHER PUBLICATIONS

KR19990003124U, abstract (Year: 1999).*
DE-102021116405-A1, abstract (Year: 2021).*

*Primary Examiner* — Hilary L Gutman
(74) *Attorney, Agent, or Firm* — HONIGMAN LLP

(57) ABSTRACT

A vehicular glass roof panel assembly includes a perimeter frame portion, a glass panel adhesively bonded to the perimeter frame portion, and side rails adhesively bonded along opposite side regions of the perimeter frame portion. The perimeter frame portion includes a plurality of latching elements configured to latch the vehicular glass roof panel assembly at a vehicle roof of a vehicle. With the latching elements latching the vehicular glass roof panel assembly at the vehicle roof, the glass panel extends across the vehicle roof and the side rails extend above respective side doors of the vehicle.

8 Claims, 25 Drawing Sheets

(56) References Cited

U.S. PATENT DOCUMENTS

| | | | |
|---|---|---|---|
| 6,431,638 B1* | 8/2002 | Mrozowski | E05B 81/25 |
| | | | 296/146.7 |
| 6,691,464 B2 | 2/2004 | Nestell et al. | |
| 7,003,916 B2 | 2/2006 | Nestell et al. | |
| 7,073,293 B2 | 7/2006 | Galer | |
| 7,086,693 B1* | 8/2006 | Huisman | B62D 25/06 |
| | | | 296/210 |
| 8,402,695 B2 | 3/2013 | Smith et al. | |
| 8,622,457 B1* | 1/2014 | McIntire | B60J 7/106 |
| | | | 296/213 |
| 8,881,458 B2 | 11/2014 | Snider et al. | |
| 8,915,018 B2 | 12/2014 | Snider | |
| 9,963,022 B2* | 5/2018 | Bowles | B60J 7/1291 |
| 11,148,733 B2* | 10/2021 | Mar | B60J 7/11 |
| 11,571,954 B2* | 2/2023 | Prather | B60J 7/11 |
| 11,584,206 B2* | 2/2023 | Boyle | B60J 1/1853 |
| 11,938,799 B1* | 3/2024 | Steig | B60J 7/11 |
| 12,037,824 B2* | 7/2024 | Bernath | E05C 9/20 |
| 2003/0159264 A1* | 8/2003 | McLeod | B62D 65/04 |
| | | | 29/428 |
| 2003/0213179 A1 | 11/2003 | Galer | |
| 2004/0020131 A1 | 2/2004 | Galer et al. | |
| 2006/0107600 A1 | 5/2006 | Nestell et al. | |
| 2008/0106124 A1 | 5/2008 | Snider | |
| 2008/0127563 A1 | 6/2008 | Tooker | |
| 2014/0047772 A1 | 2/2014 | Hulst | |
| 2014/0097636 A1* | 4/2014 | Snider | B60J 3/02 |
| | | | 296/97.8 |
| 2016/0167492 A1* | 6/2016 | Ikeda | B60J 5/101 |
| | | | 296/146.2 |
| 2018/0186222 A1* | 7/2018 | Hall | B60J 7/11 |
| 2019/0308673 A1* | 10/2019 | Mar | B62D 33/08 |
| 2022/0371415 A1* | 11/2022 | Prather | B60J 7/194 |
| 2023/0131621 A1* | 4/2023 | Bojanowski | B60J 7/1635 |
| | | | 49/465 |
| 2024/0359544 A1* | 10/2024 | Steig | B60J 7/1635 |

\* cited by examiner

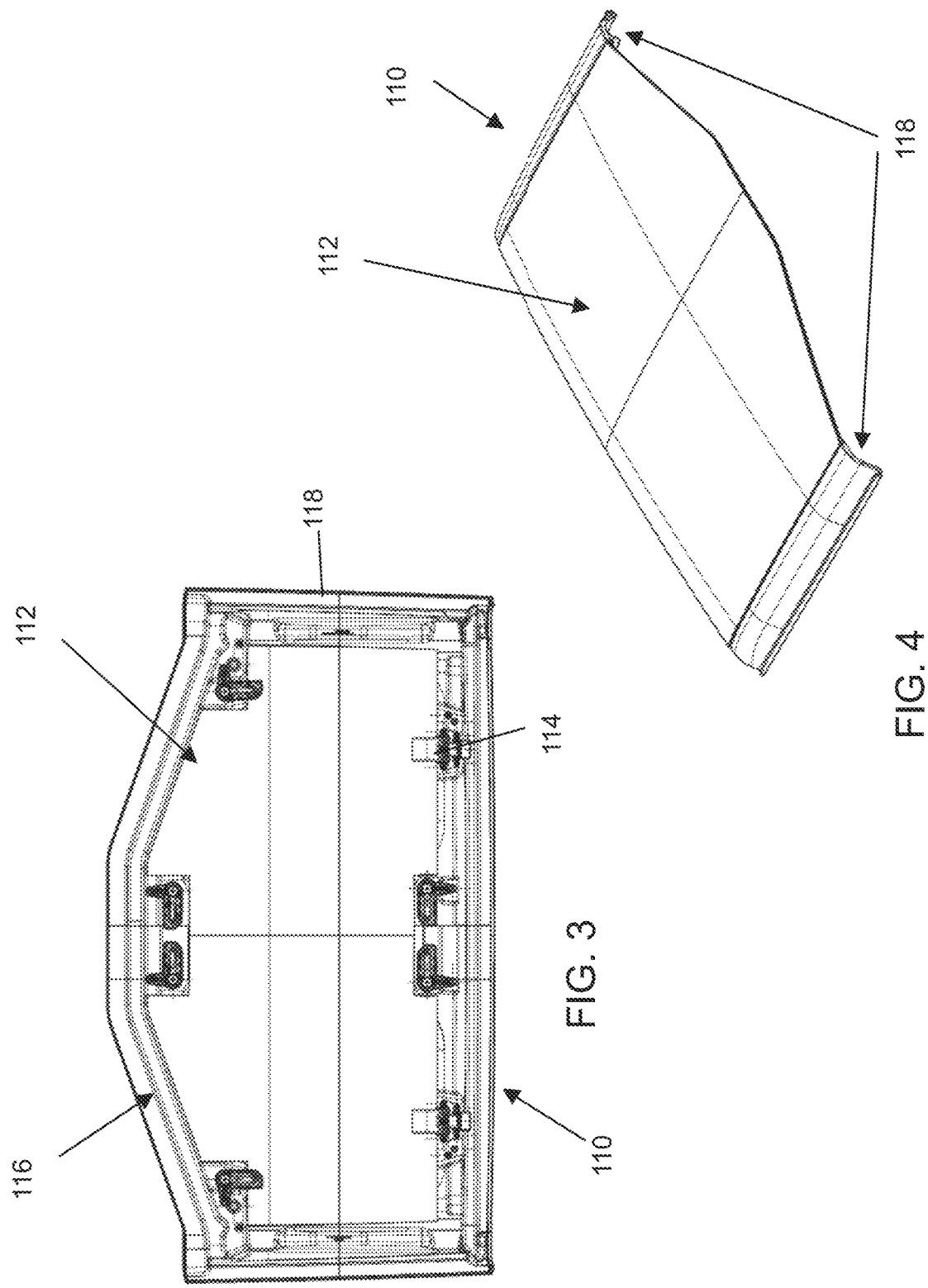

GLASS ROOF PANEL ASSEMBLY FOR VEHICLE ROOF

CROSS REFERENCE TO RELATED APPLICATIONS

The present application claims the filing benefits of U.S. provisional application Ser. No. 63/366,940, filed Jun. 24, 2022, U.S. provisional application Ser. No. 63/365,800, filed Jun. 3, 2022, U.S. provisional application Ser. No. 63/363,206, filed Apr. 19, 2022, and U.S. provisional application Ser. No. 63/260,970, filed Sep. 8, 2021, which are all hereby incorporated herein by reference in their entireties.

FIELD OF THE INVENTION

The present invention relates to openable/closable roof panel assemblies for vehicles.

BACKGROUND OF THE INVENTION

It is known to provide a removable and/or openable/closable roof panel assembly at a roof of a vehicle. The panels are attached via latches to the roof of the vehicle and can be removed to provide a partially open top.

SUMMARY OF THE INVENTION

The present invention provides a glass roof panel assembly for a non-glass vehicle roof that includes a perimeter frame portion and a glass panel adhesively bonded to the perimeter frame portion. Side rails are adhesively bonded along opposite side regions of the glass frame portion. The perimeter frame portion comprises a plurality of latching elements configured to latch the vehicular glass roof panel assembly at a vehicle roof. With the latching elements latching the vehicular glass roof panel assembly at a vehicle roof, the glass panel extends across the vehicle roof and the side rails extend over respective side doors of the vehicle. The latching elements are arranged at the perimeter frame portion so as to correspond with the location of latching elements disposed at the vehicle and used for latching separate plastic or metal roof panels at the vehicle roof. Thus, the glass roof panel assembly provides a transparent glass roof panel at a vehicle roof that can be detachably attached at the roof, such as to temporarily replace separate plastic or metal roof panels to retrofit the vehicle with a glass panel over at least a portion of the vehicle cabin.

In some examples, a vehicular glass panel assembly includes (i) a perimeter frame portion (ii) a glass panel adhesively bonded to the perimeter frame portion, and (iii) side rails adhesively bonded along opposite side regions of the perimeter frame portion. The perimeter frame portion comprises a plurality of latching elements configured to latch the vehicular glass roof panel assembly at a vehicle roof. With the latching elements latching the vehicular glass roof panel assembly at the vehicle roof, the glass panel extends across the vehicle roof and the side rails extend above respective side doors of the vehicle. A storage device for storing the vehicular glass roof panel assembly at a portion of the vehicle when the vehicular glass roof panel assembly is not attached at the vehicle. The storage device comprises a frame coupled to the vehicle and further comprises a retaining element adjustably mounted at the frame and adjustable between a raised unlocked state and a lowered locked state. With the vehicular glass roof panel assembly disposed at the storage device, and with the retaining element in the lowered locked state, the retaining element is secured to the frame to retain the vehicular glass roof panel assembly at the storage device.

These and other objects, advantages, purposes and features of the present invention will become apparent upon review of the following specification in conjunction with the drawings.

BRIEF DESCRIPTION OF THE DRAWINGS

FIG. 3 is a plan view of a glass roof panel that is configured to replace the roof panels of FIG. 1;

FIGS. 4-6 are perspective views of the glass roof panel of FIG. 3;

DESCRIPTION OF THE PREFERRED EMBODIMENTS

Figure 2:
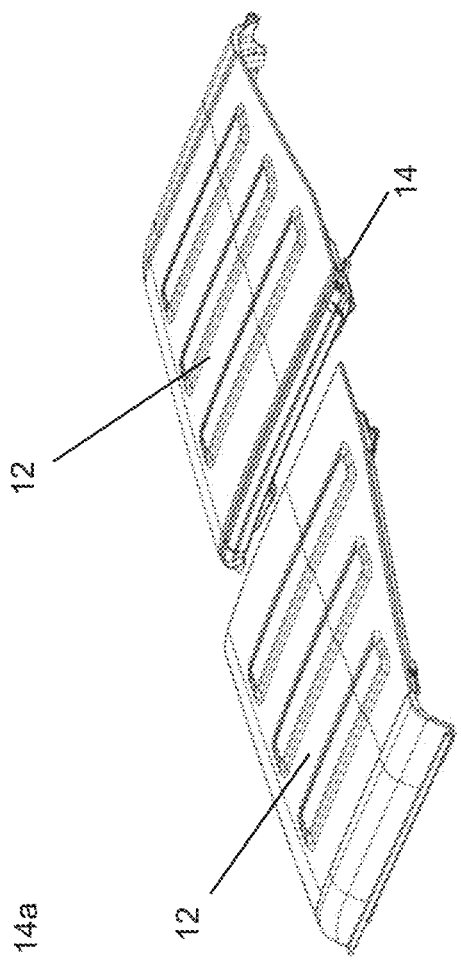
FIG. 2 is a perspective view of the panels, shown separated from one another.
Figure 1:
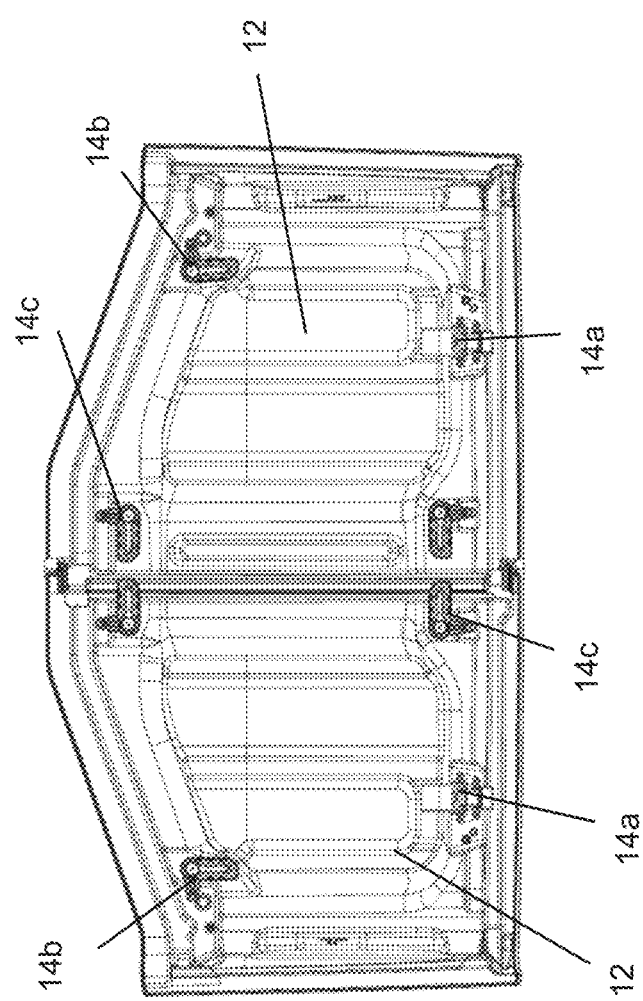
FIG. 1 is a plan view of opaque plastic or metal roof panels for a vehicle, shown with the panels joined together.
Figure 5:
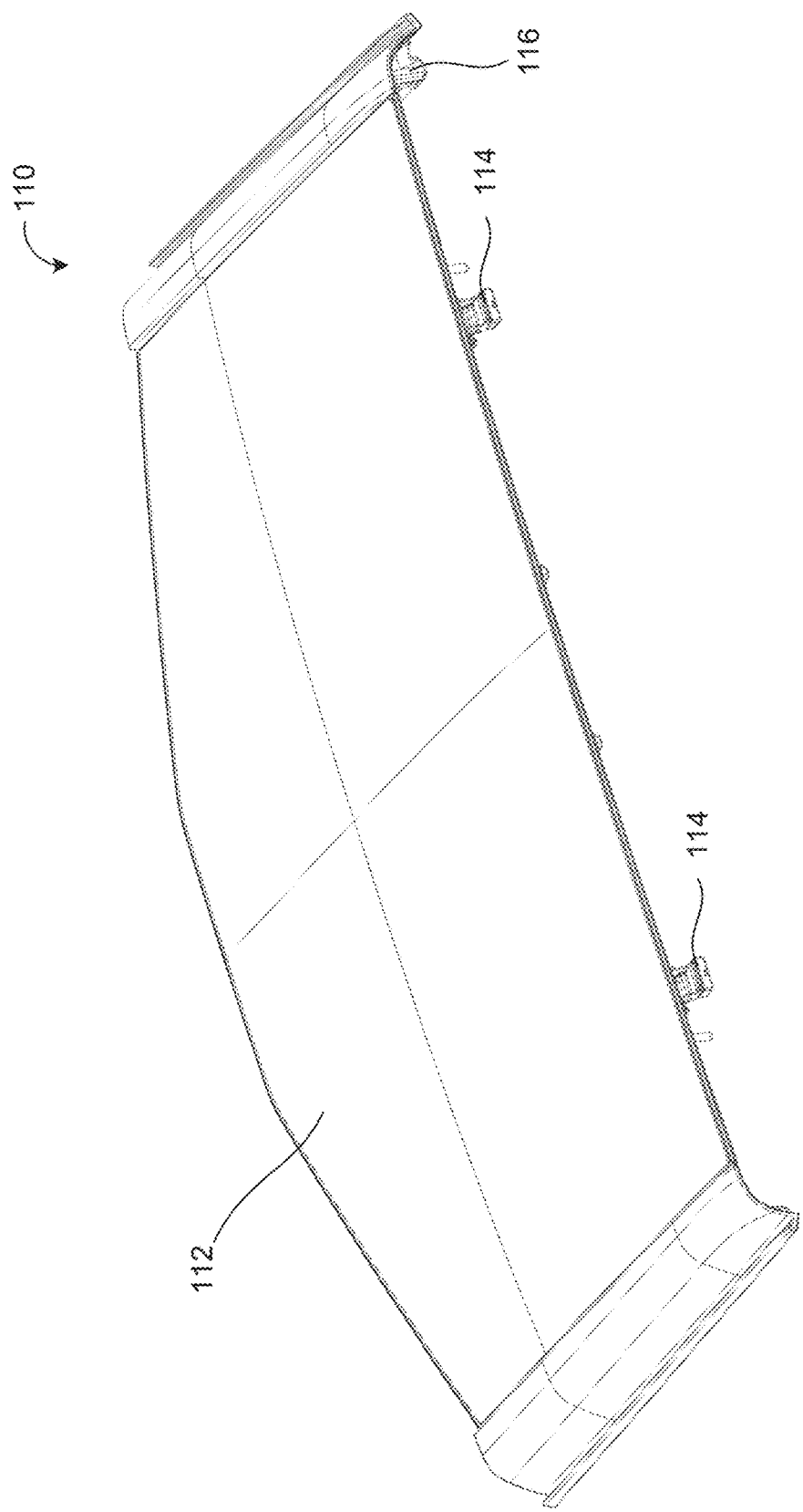
Figure 6:
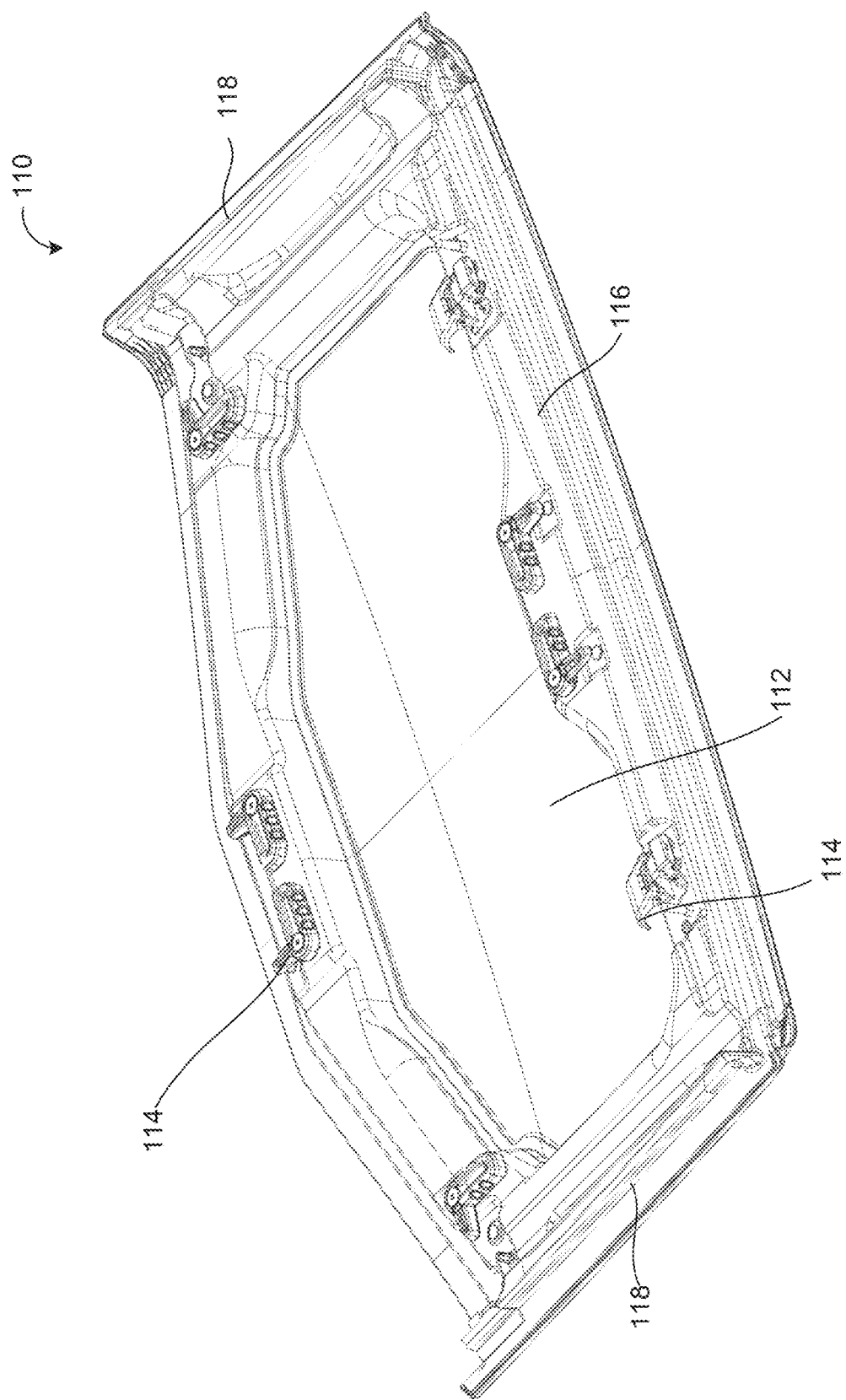
Figure 7:
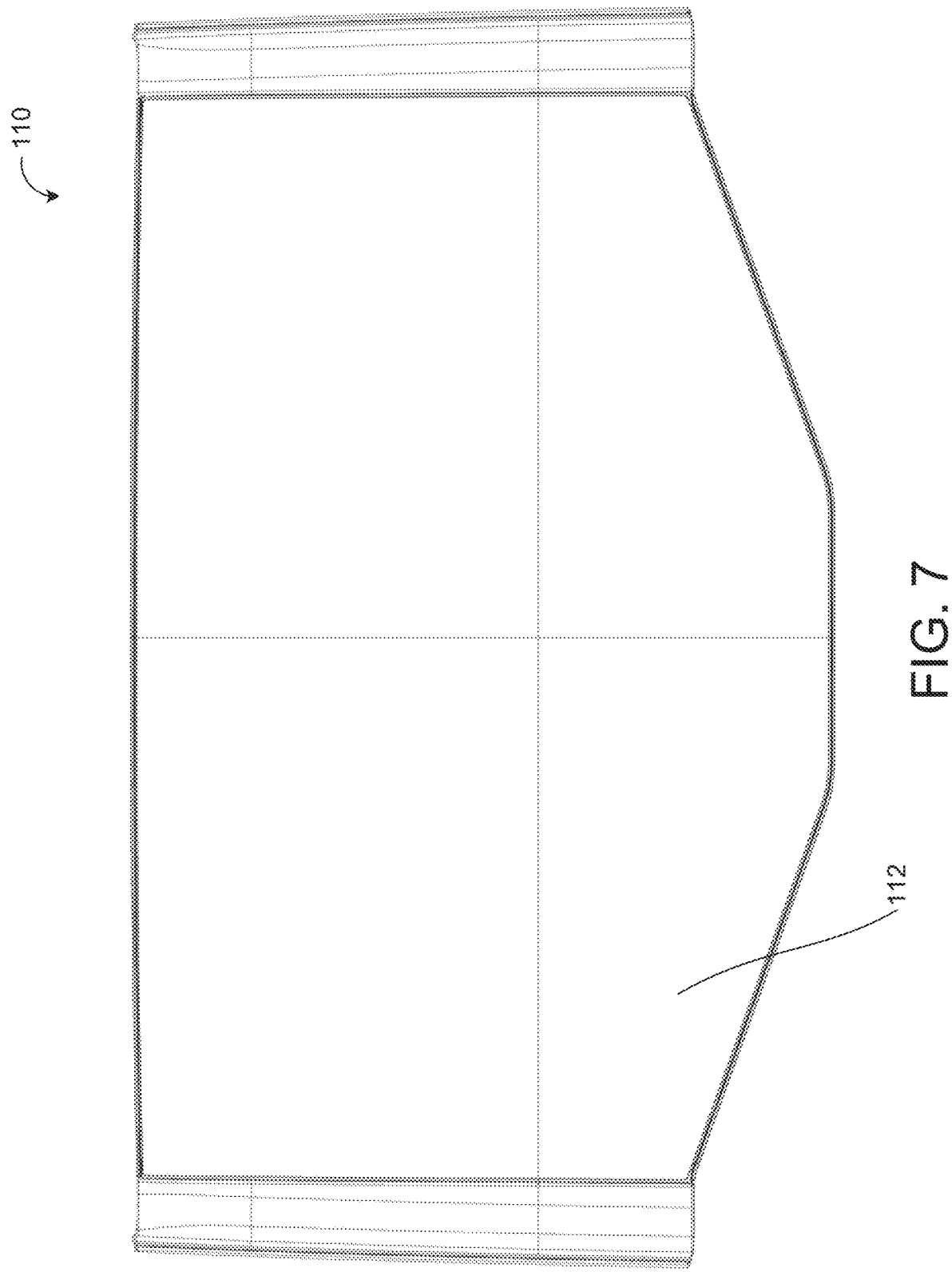
FIGS. 7 and 8 are plan views of the glass roof panel of FIG. 3.
Figure 8:
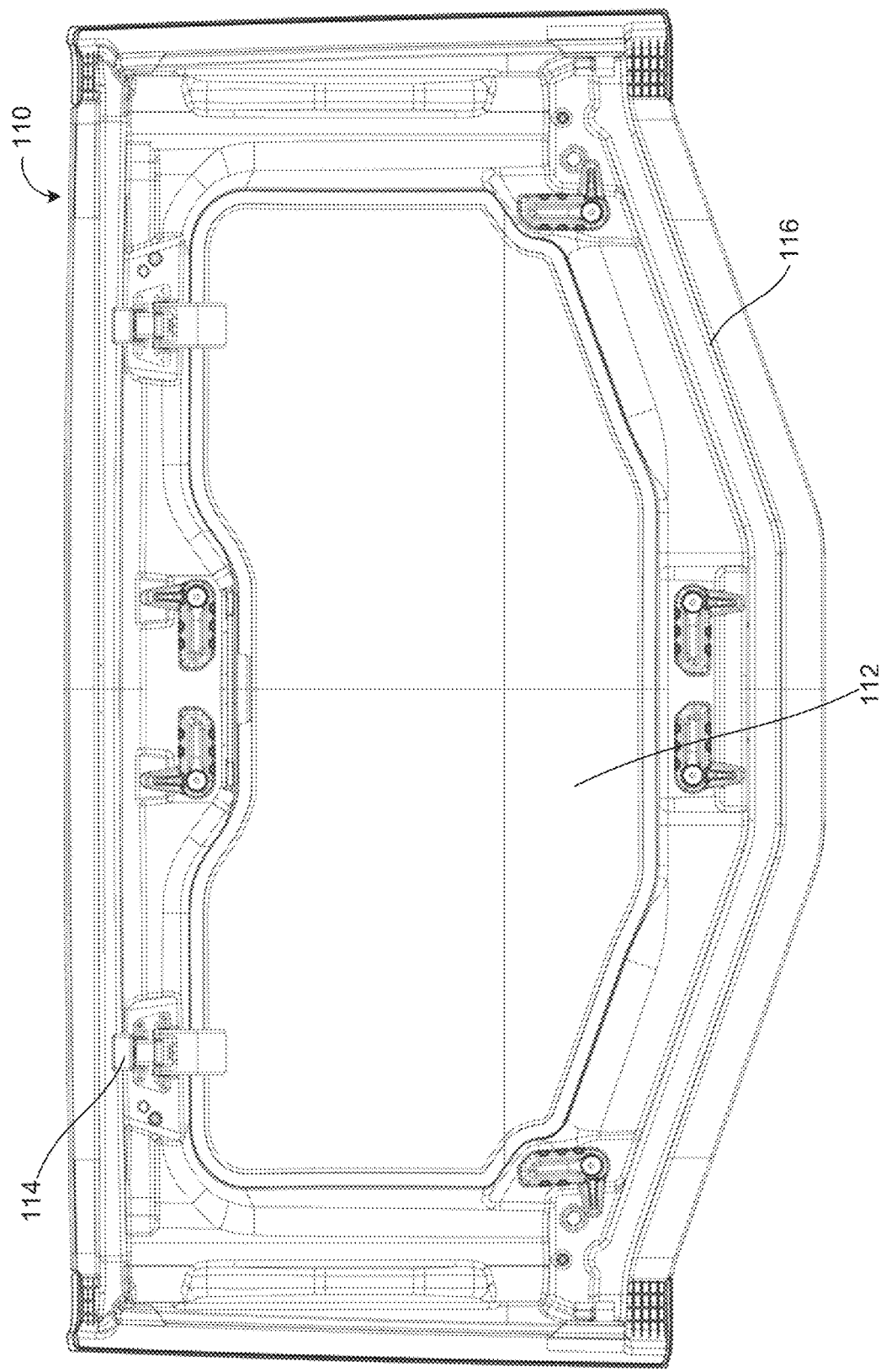

Some vehicles have removable roof panels to allow a user to remove the panels to provide a partially open top. Such removable roof panels are available on, for example, a MY2021 JEEP® WRANGLER. For example, and such as shown in FIGS. 1 and 2, a pair of roof panels 12 may be configured to attach at the vehicle via a plurality of latches 14. The roof panels are configured for separate attachment at the respective side region of the vehicle roof via the respective latches 14. As shown in FIGS. 1 and 2, the center parts of the panels are configured to engage one another to retain the panels together when they are attached at the vehicle. The panels are each detachably attached at the respective side region of the vehicle via a front latch 14a and a rear latch 14b, and also attach to each other (when attached at the vehicle) via respective pivoting center latches 14c. The panels 12 may comprise plastic or metal panels that generally match or correspond with the rest of the roof of the vehicle.

A glass panel assembly 110 (FIGS. 3-12) includes a glass roof panel 112 that is attachable or mountable at a roof of a vehicle via a plurality of latches or latching elements 114. The latches 114 are attached at a perimeter frame portion or halo 116 that is bonded or adhesively attached at the inner side of the glass roof panel 112. The latches 114 correspond to or match the latches of the plastic or metal panels of the known removable panels, so that the glass panel assembly 110 can be mounted at the vehicle in a similar manner as the two separate plastic or metal panels. The frame portion 116 of the glass panel assembly 110 is bonded at the glass roof panel and includes opposite side rails 118 that are disposed at or along the side portions of the perimeter frame portion 116. The frame portion also includes forward and rearward frame portions that are bonded at the underside of the glass and that do not encroach on the exposed forward and rearward edge portions of the glass panel.

Figure 12:
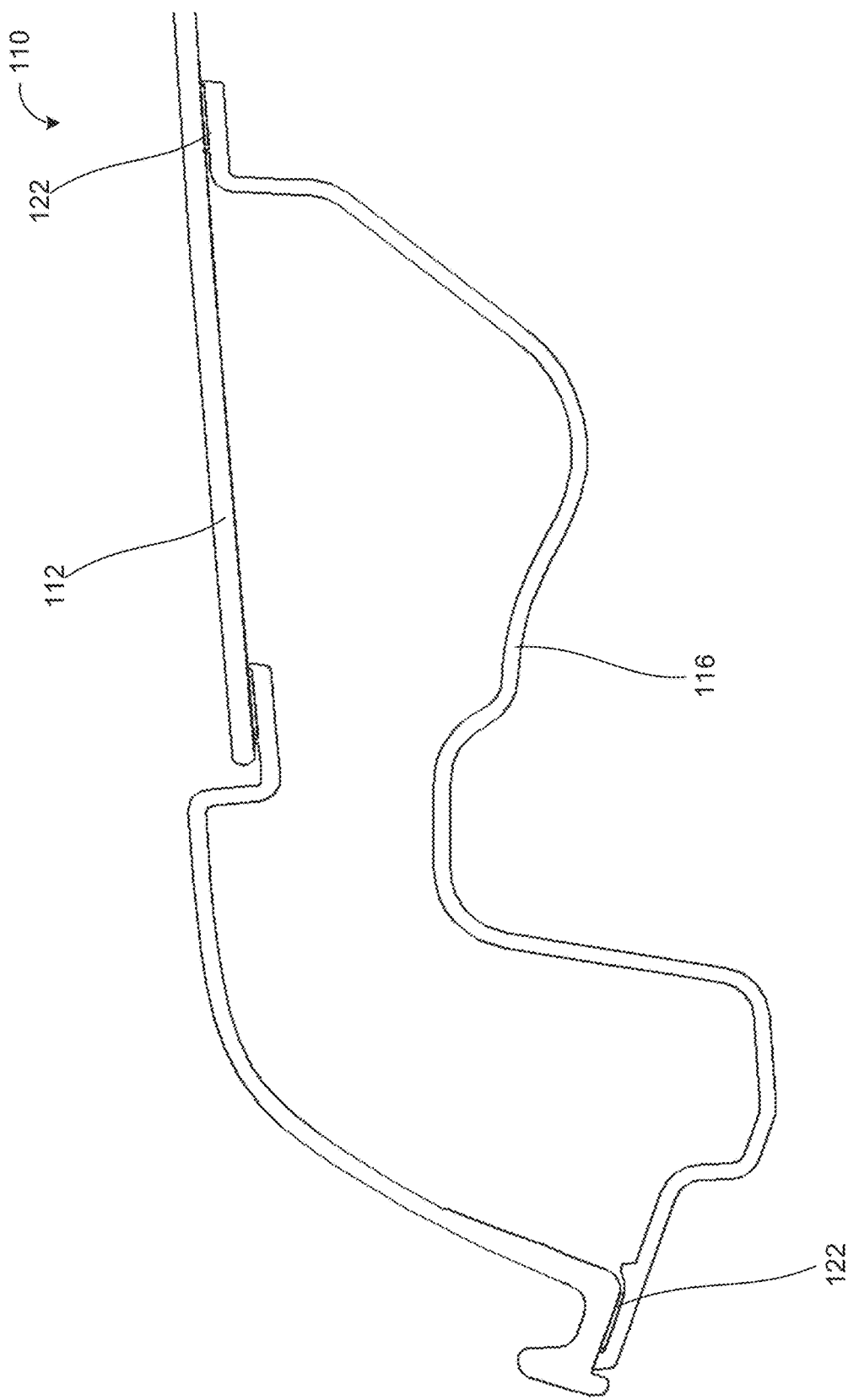

As shown in FIGS. 9-12, the perimeter frame 116 comprises a plastic frame that is adhesively attached at the lower or inner side of the glass roof panel 112 via adhesive 122. A pair of end caps 124 are disposed along the side regions of the glass roof panel 112 and the perimeter frame 116. As shown in FIG. 12, the end caps are adhesively bonded along an upper edge region to the underside of the glass roof panel via adhesive 122 and bonded to an outer edge region of the perimeter frame 116 via adhesive 123. Stated differently, the adhesive 122 is disposed between the glass roof panel 112 and the perimeter frame portion 116 or the end caps 124, such that the glass roof panel 112 is adhesively attached to both the perimeter frame portion 116 and the end caps 124. Similarly, the adhesive 123 is disposed between the perimeter frame portion 116 and the end caps 124, such that the end caps 124 are also adhesively attached to the perimeter frame portion 116. Alternatively, the glass roof panel 112 may be adhesively coupled to only the perimeter frame portion 116, while the end caps 124 may be otherwise attached or coupled to the perimeter frame portion 116.

Figure 9:
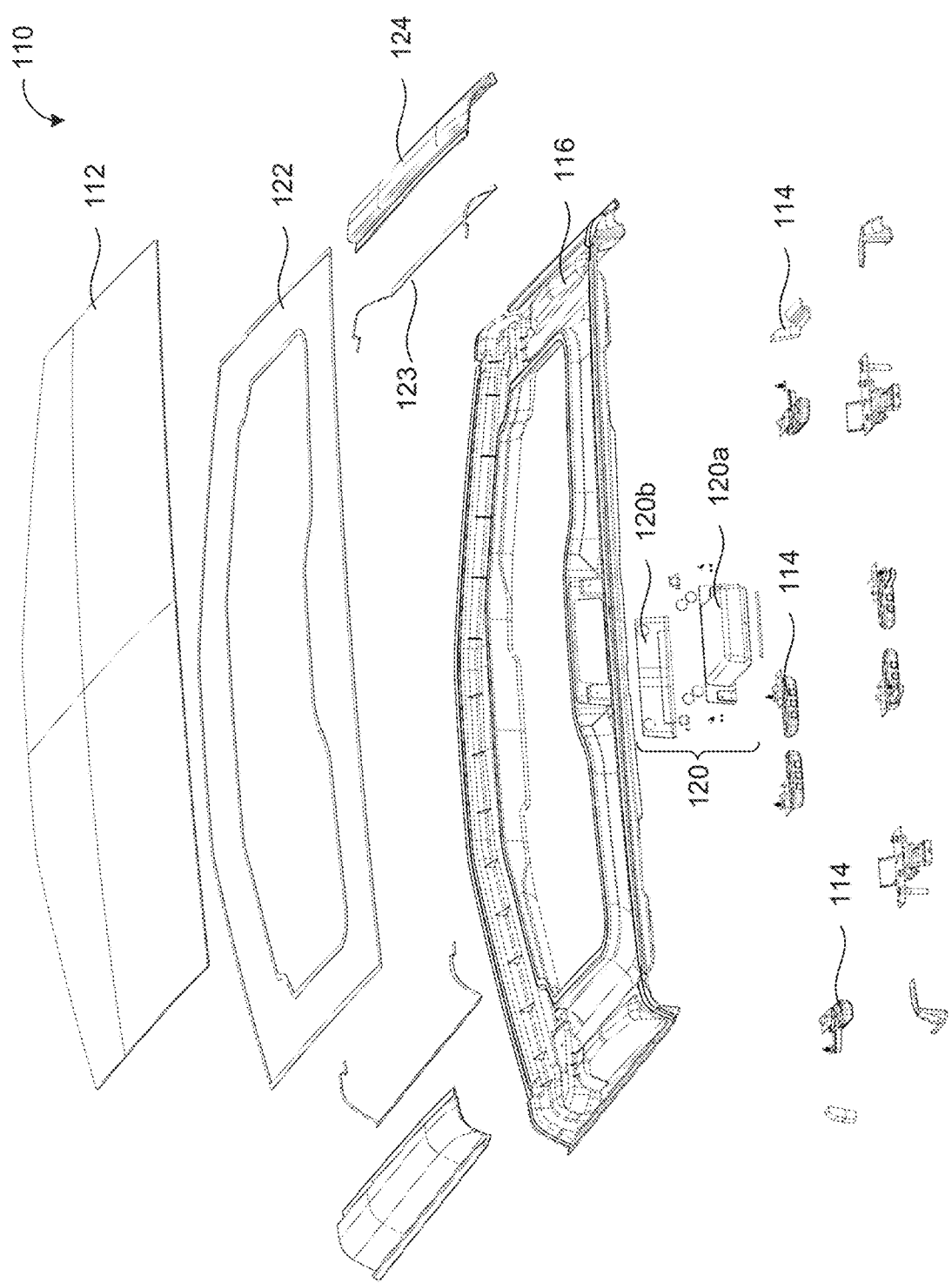
FIG. 9 is an exploded view of the glass roof panel of FIG. 3.
Figure 10:
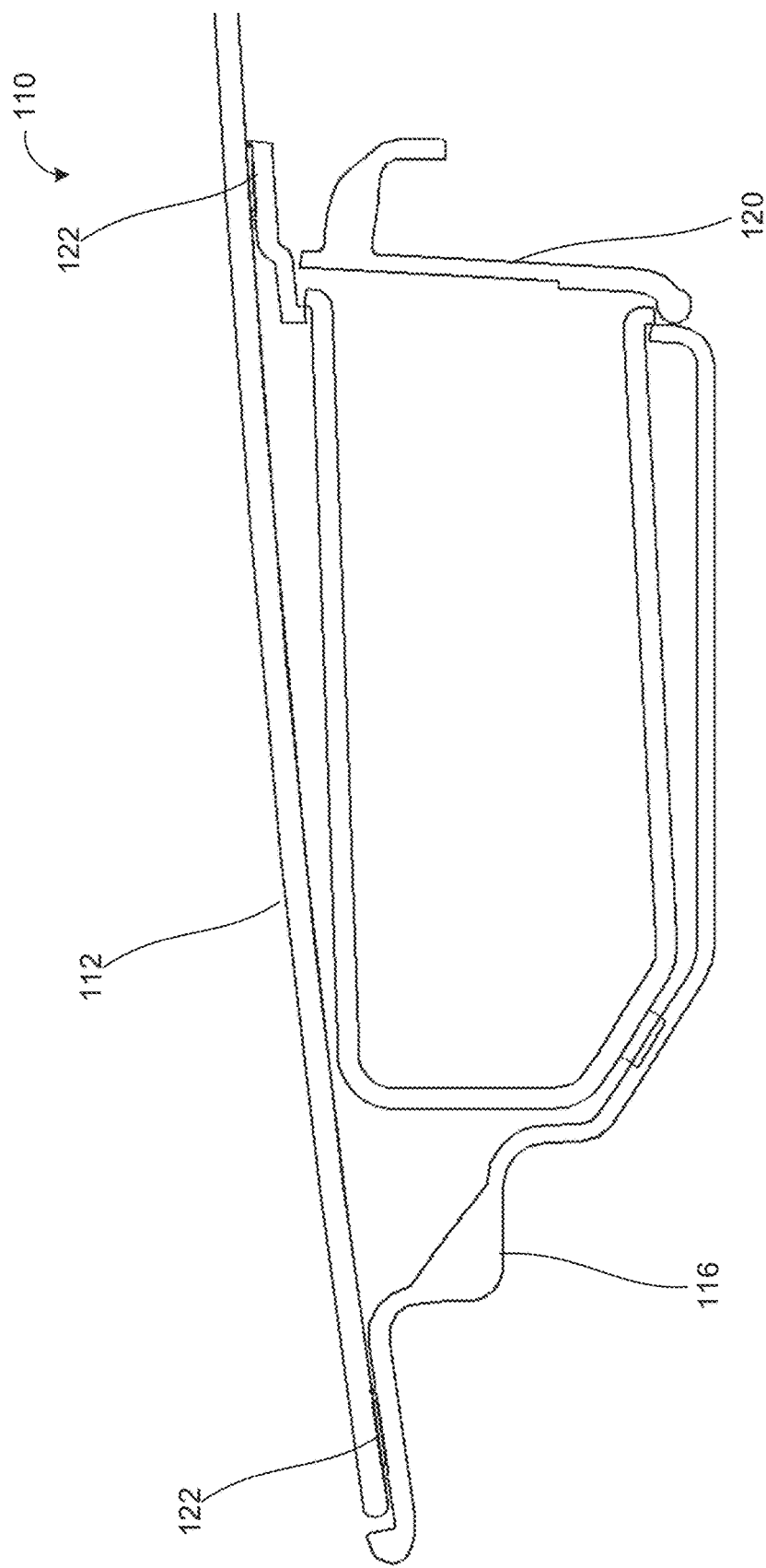
FIGS. 10-12 are cross-section views of the glass roof panel of FIG. 3.
Figure 11:
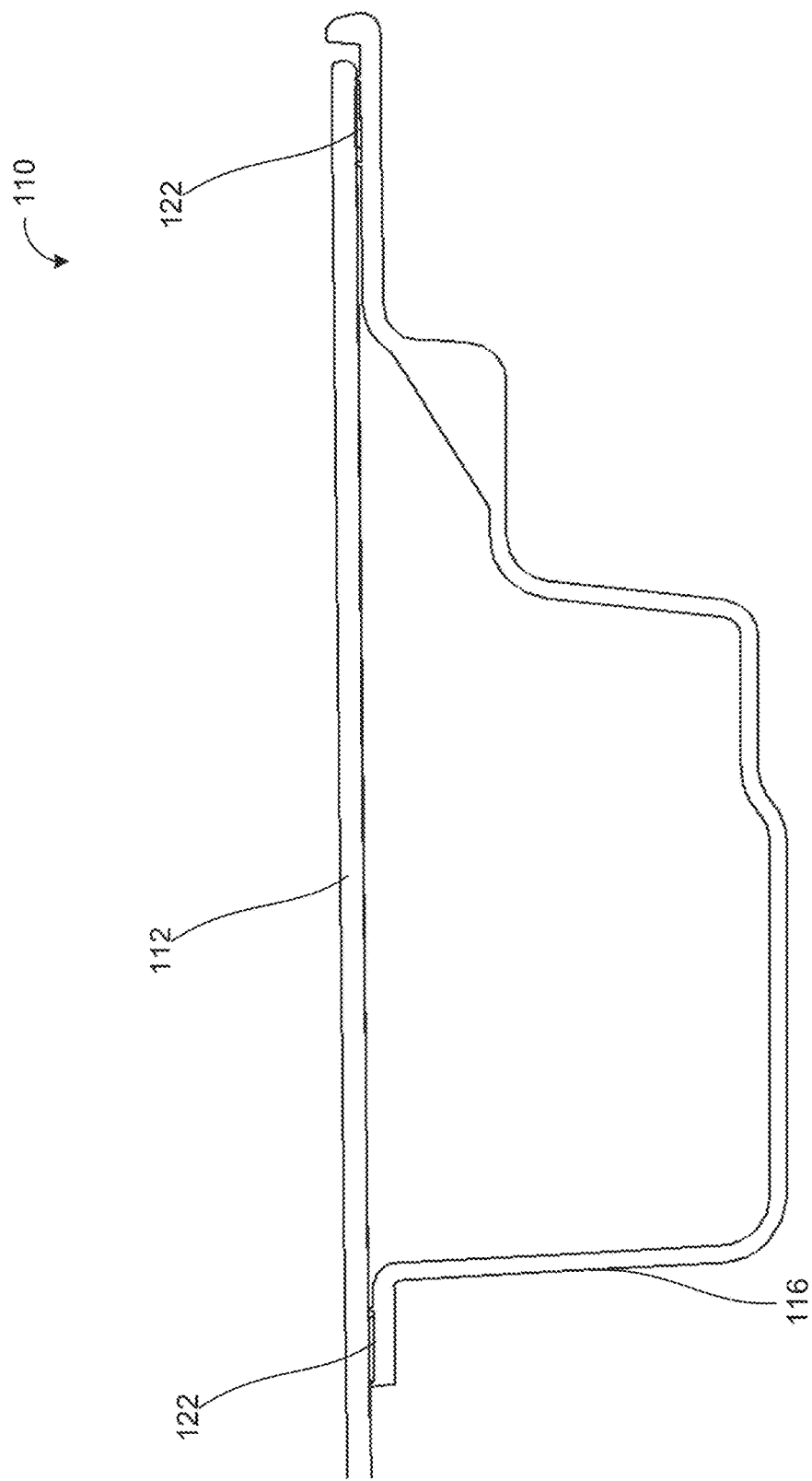

The glass panel assembly 110 may also include a bin or storage enclosure or receiving pocket 120. The bin enclosure 120 may be formed as part of the perimeter frame portion 116, such as along a forward perimeter region of the perimeter frame portion 116. For example, the bin enclosure 120 may be injection molded into the perimeter frame portion 116, and thus formed via the same injection molding process that forms the perimeter frame portion 116. Optionally, the bin enclosure 120 may be attached to the perimeter frame portion 116. As shown in FIGS. 9 and 10, the bin enclosure 120 includes a pocket or receiving portion 120a and a door or closure panel 120b hingedly attached at the pocket so that the door 120b can be opened by a user to access the pocket 120a and closed to conceal the items placed in the pocket 120a. The bin enclosure 120 is attachable at the perimeter frame portion 116 as a unit, with the pocket 120a received in and encased by the wall of the perimeter frame portion 116 (see FIG. 10).

The perimeter frame portion is bonded to the inner or lower side of the glass roof panel via the adhesive 122. The perimeter frame portion includes seals that seal against the roof when the glass roof panel assembly is attached at the vehicle roof, so as to limit or preclude water intrusion into the vehicle cabin. The perimeter frame portion includes locating pins or guiding elements that engage corresponding locating recesses at the roof to guide the glass roof panel assembly into position as it is placed at the vehicle roof. The locating pins and latches are located at the perimeter frame portion so as to correspond to the locating pins and latches of existing roof panels, so the glass roof panel assembly can be used to replace the existing roof panels of the vehicle. The perimeter frame portion may comprise a plastic frame portion or a metal frame portion.

In an alternate configuration illustrated in FIGS. 13-19, a glass roof assembly 210 includes two glass panel assemblies 211a, 211b. The first glass panel assembly 211a includes a first glass roof panel 212a and the second glass panel assembly 211b includes a second glass roof panel 212b that are respectively attachable or mountable to a roof of a vehicle via a plurality of respective latches or latching elements 214. The latches 214 are attached at first and second perimeter frame or halo portions 216a, 216b of the glass panel assemblies 211a, 211b, respectively. The perimeter frames 216a, 216b are bonded or adhesively attached at the inner side of the respective first and second glass roof panels 212a, 212b. The latches 214 correspond to or match the latches of the plastic or metal panels of the known removable panels, so that each of the first and second glass panel assemblies 211a, 211b of the glass roof assembly 210 can be mounted at the vehicle in a similar manner as two separate plastic or metal panels and/or a single plastic or metal panel. The perimeter frame 216a, 216b of each glass panel assembly 211a, 211b includes a respective side rail 218 that is disposed at or along the laterally outboard side portion of each of the first and second perimeter frame portions 216a, 216b, respectively.

The glass panel assemblies 211a, 211b also each include an outer adhesive or adhesive molding 222a and an inner adhesive or adhesive molding 222b. The outer adhesive 222a attaches the glass roof panels 212a, 212b to an outer perimeter frame portion or molding 236a of the respective perimeter frame portion 216a, 216b, and the inner adhesive 222b attaches the outer molding 236a to an inner perimeter frame portion or molding 236b of the perimeter frame portions 216a, 216b. The inner and outer moldings 236a, 236b of the perimeter frame portions 216a, 216b may comprise a plastic or polymeric material and may be formed via a plastic injection molding process. The glass roof panels 212a, 212b are adhesively attached or bonded to the outer moldings 236a of the perimeter frame portions 216a, 216b, respectively, such that the glass roof panels 212a, 212b may be recessed within the outer moldings 236a to provide a flush panel at a top of the vehicle. Stated differently, each of the outer moldings 236a may have a recessed rim or internal perimeter 238 that receives the respective glass panel 212a, 212b. The recessed rim 238 positions the glass panels 212a, 212b to be generally flush with a surface 240 of the respective outer molding 236a.

Figure 13:
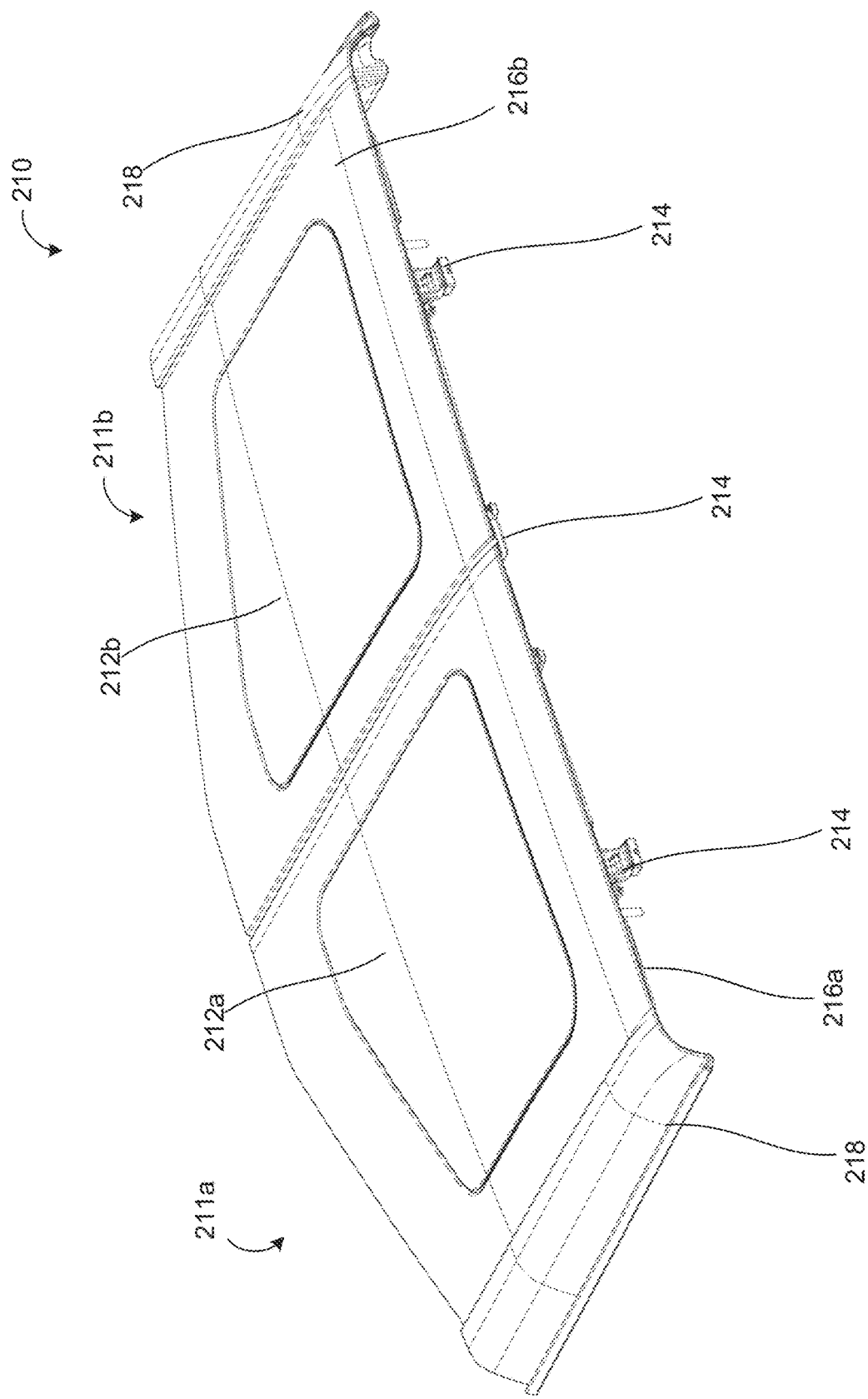
FIGS. 13 and 14 are perspective views of glass roof panels, shown with the panels joined together, that are configured to replace the roof panels of FIG. 1.
Figure 17:
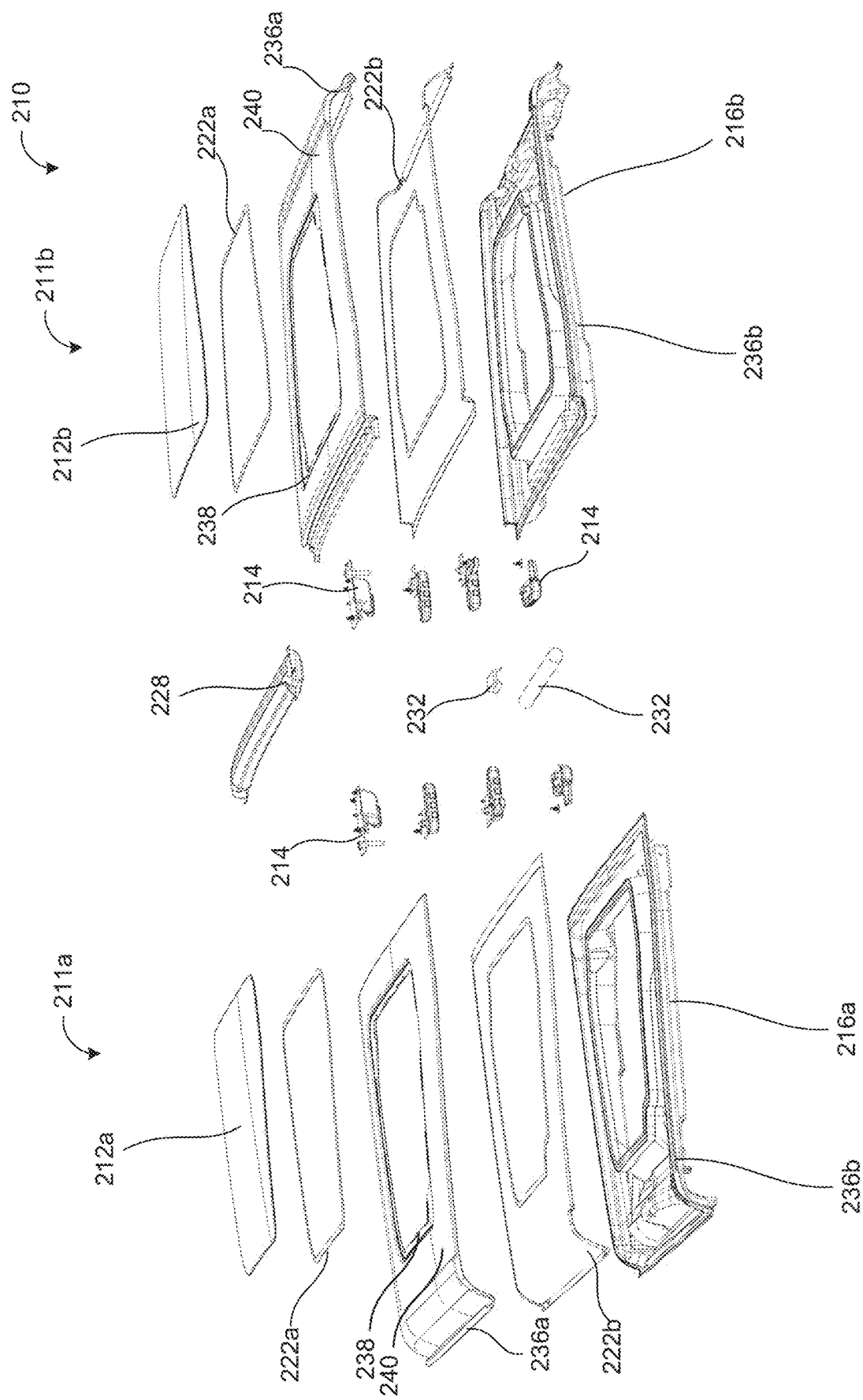
FIG. 17 is an exploded view of the glass roof panels of FIG. 13.
Figure 18:
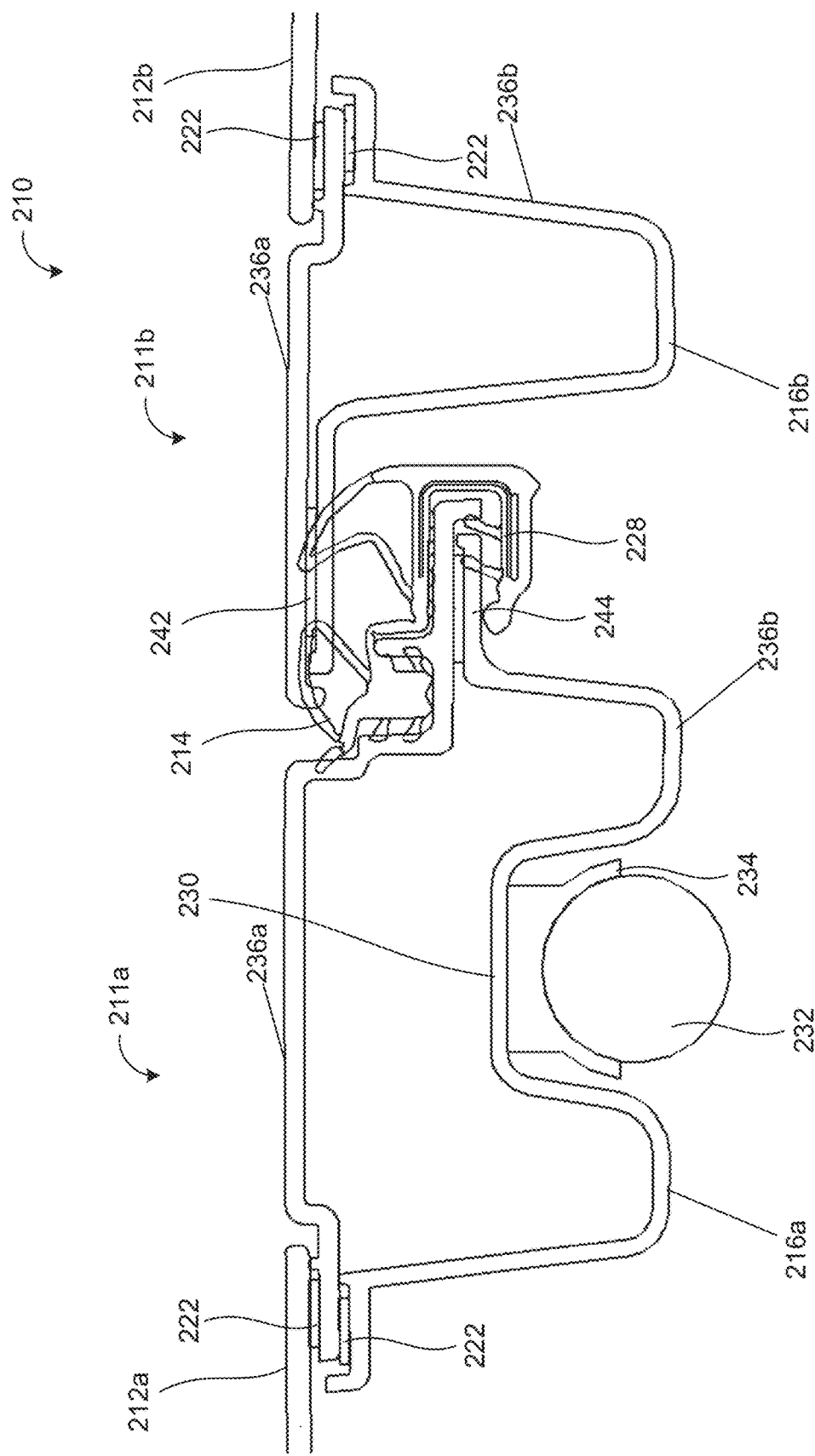
FIGS. 18 and 19 are cross-sectional views of the glass roof panels of FIG. 13.
Figure 19:
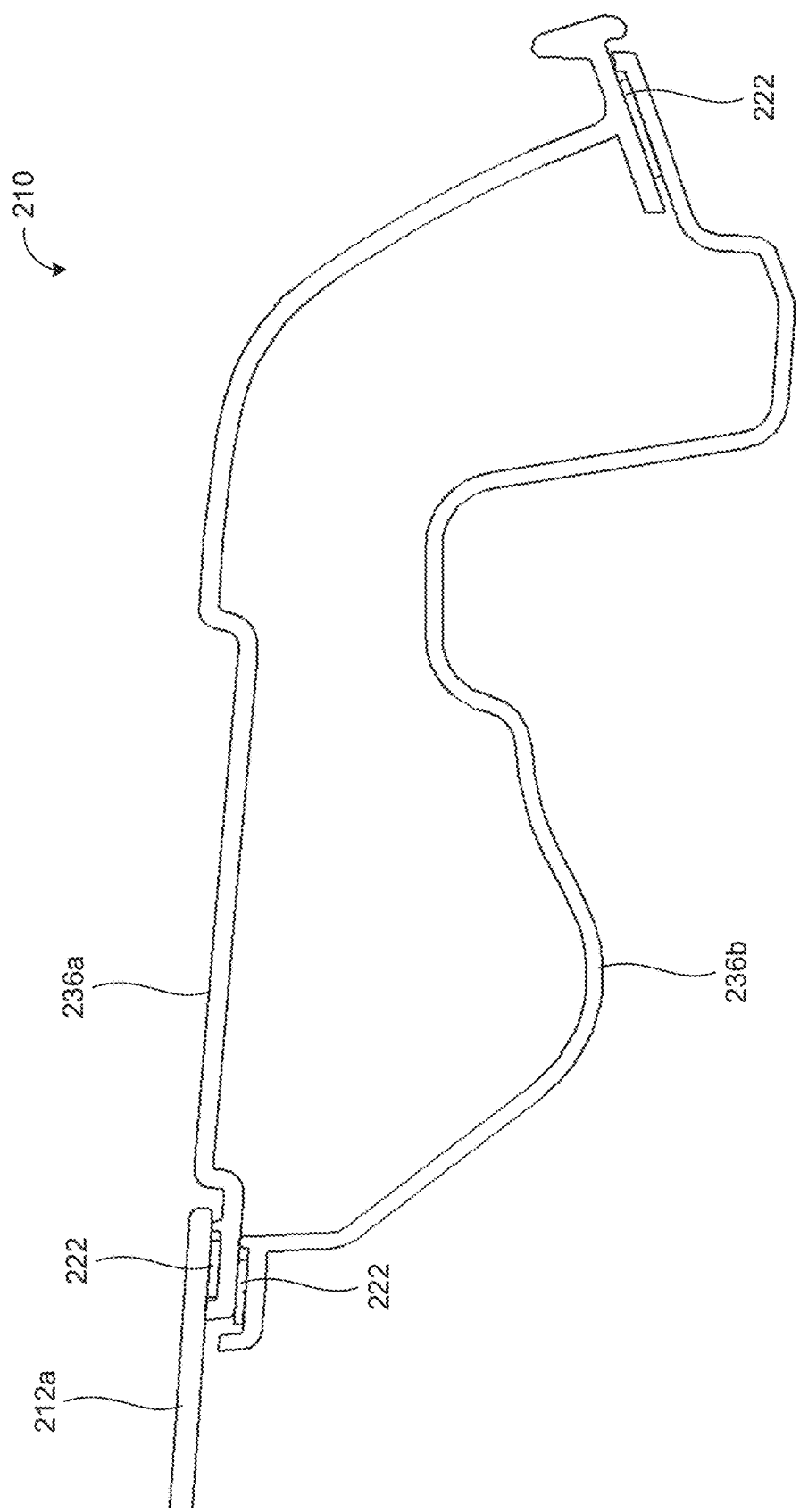

For example, as illustrated in FIGS. 17 and 18, the outer adhesive 222a may be disposed or positioned along the recessed rim 238 of the outer molding 236a, and the respective glass roof panel 212a, 212b may be disposed at the outer adhesive 222a within the outer molding 236a along the recessed rim 238. The glass panels 212a, 212b cover or are positioned or disposed over an opening of the respective outer molding 236a. In the illustrated embodiment, the glass roof panels 212a, 212b form a continuous or flush surface with the perimeter frame portions 216a, 216b, respectively (FIG. 13).

Optionally, while the glass roof panels 212a, 212b and the outer moldings 236a may respectively define a flush surface of the top of the vehicle, it is contemplated that a space may be defined between the respective glass panel assemblies 211a, 211b. Stated differently, the surface 240 of the outer molding 236a of the first perimeter frame portion 216a is not continuous with the surface 240 of the outer molding 236a of the second perimeter frame portion 216b. The glass panel assemblies 211a, 211b may be connected via the latches 214 and may include a central seal 228 disposed between the two assemblies 211a, 211b and sealing against both assemblies at the gap between the glass panel assemblies.

The central seal 228 disposed between the first and second glass panel assemblies 211a, 211b may close or seal or otherwise maintain a water-tight connection between the glass panel assemblies 211a, 211b. In the illustrated embodiment, the second panel assembly 211b includes a lower lip 244 along the inner perimeter edge and the first panel assembly 211a includes an upper lip 242 along the inner perimeter edge (see FIG. 18). The central seal 228 is disposed along or attached at the lower lip 244. When the panel assemblies 211a, 211b are attached at a vehicle, the upper lip 242 overlaps along the lower lip 244, with the central seal 228 sealing against the underside of the upper lip 242. Optionally, the latches 214 may extend from the lower lip 244 of the first panel assembly 211a toward the upper lip 242 of the second panel assembly 211b to attach the two panel assemblies 211a, 211b. The central seal 228 may be compressed between the upper and lower lips 242, 244 to seal the glass roof assembly 210.

Figure 14:
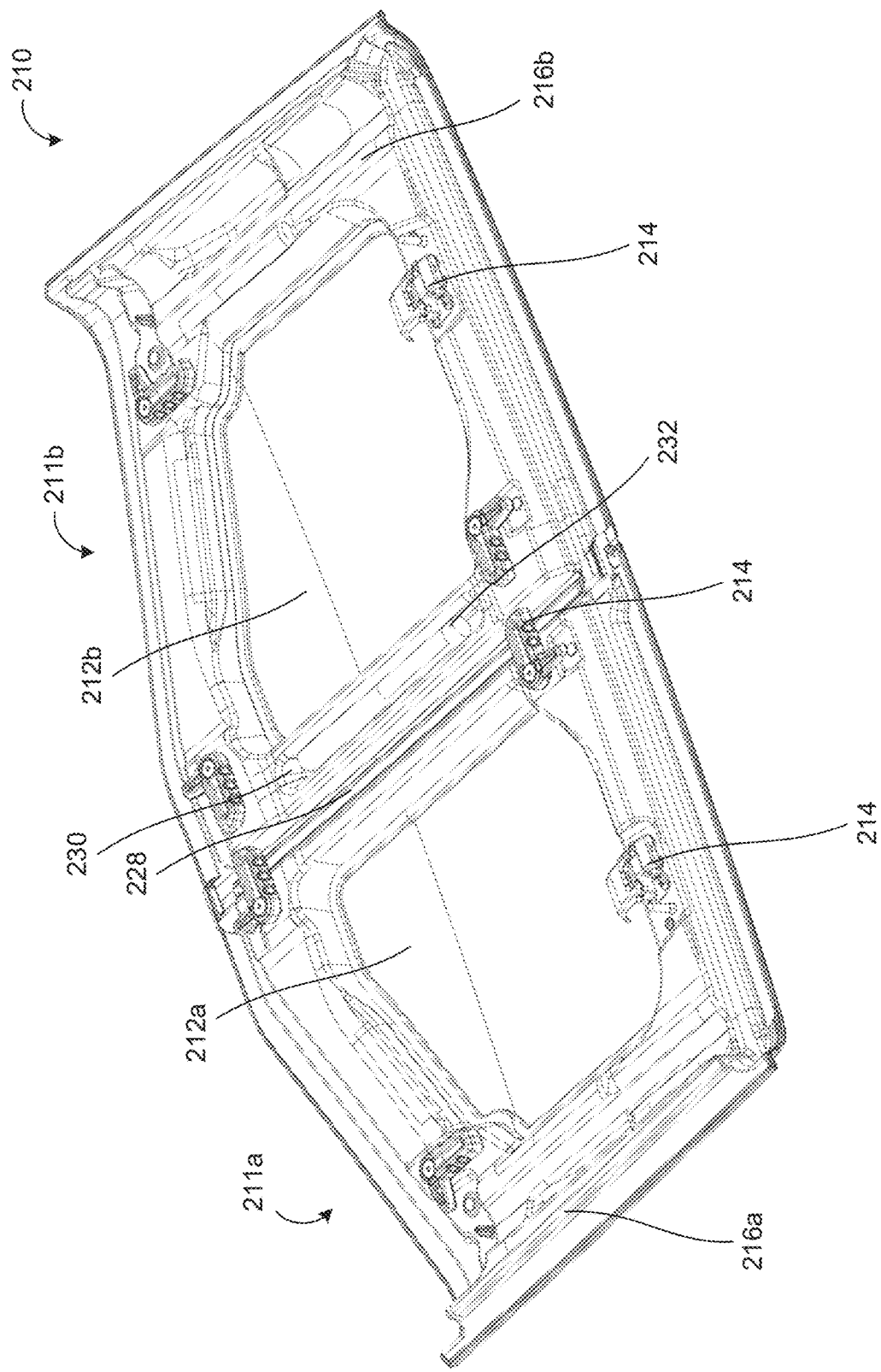
Figure 15:
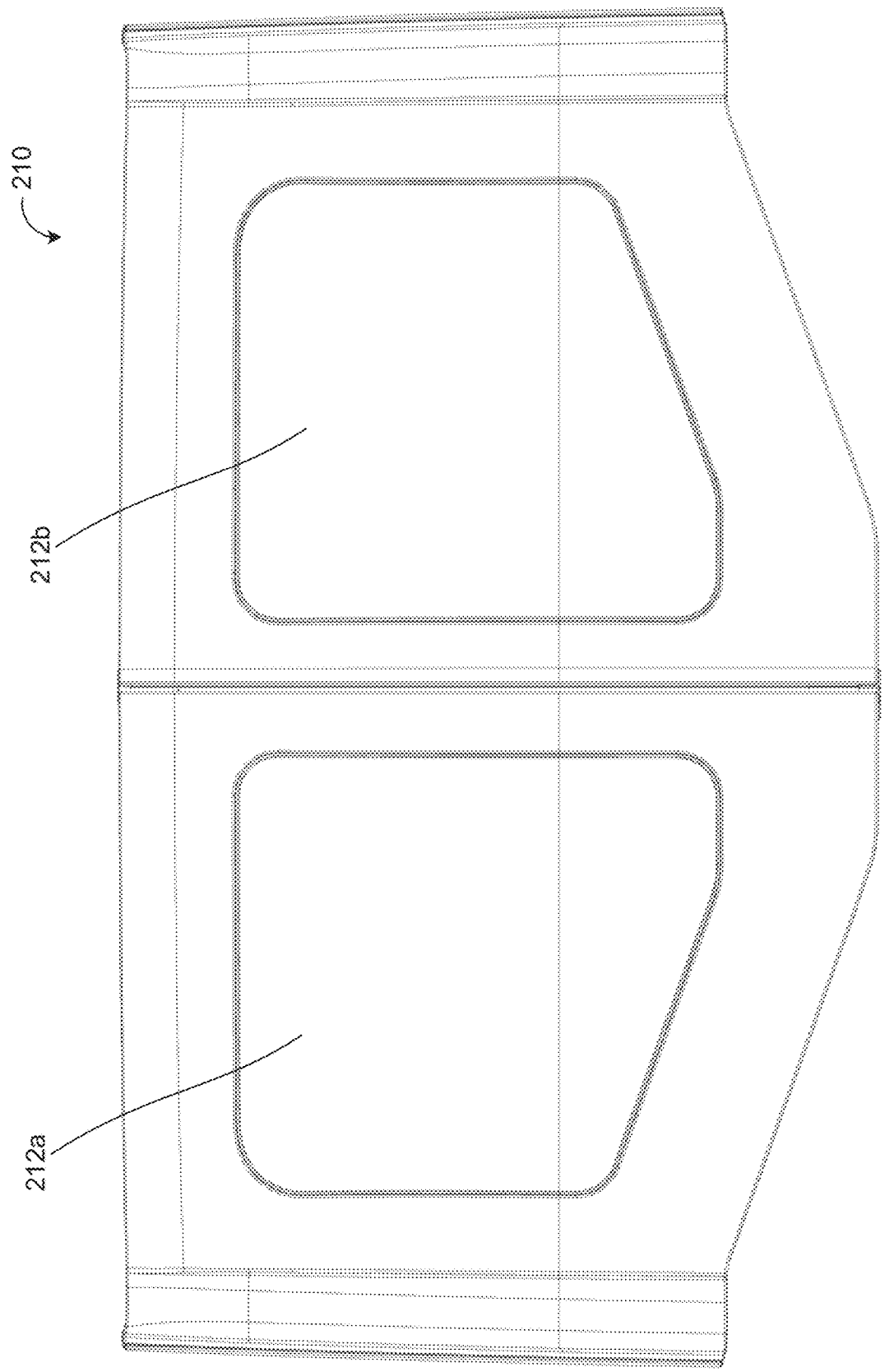
FIGS. 15 and 16 are plan views of the glass roof panels of FIG. 13.
Figure 16:
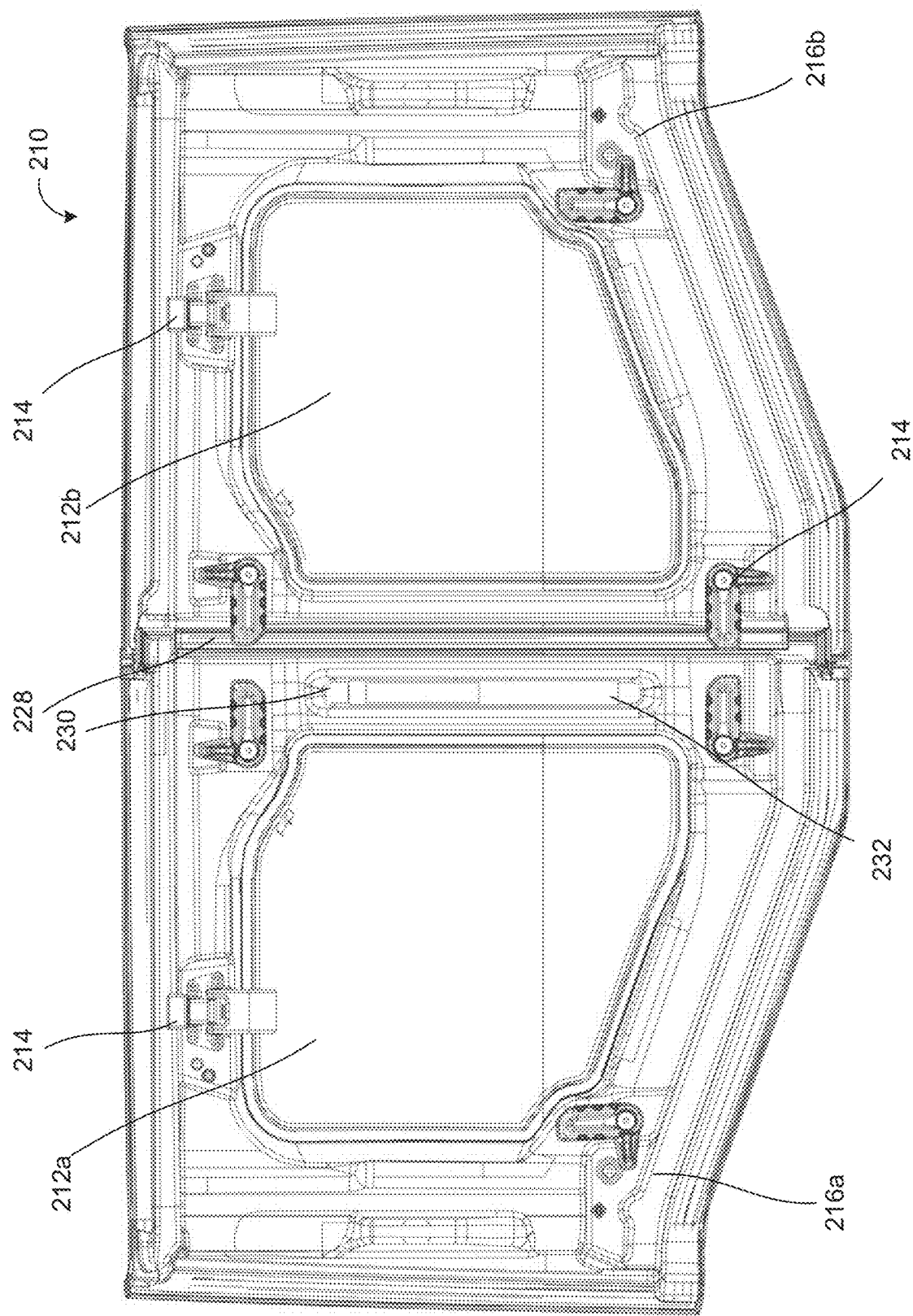

As illustrated in FIGS. 14, 16 and 17, one or both of the first perimeter frame 216a and the second perimeter frame 216b may include a recess or receptacle 230 that may receive a flashlight or illumination device 232 (or other electrical or battery powered component or accessory or a non-powered component or accessory). The flashlight 232 may be attached to the respective perimeter frame portion 216a, 216b via a light mount 234 disposed within the recess 230. It is contemplated that the flashlight 232 may be electrically connected to the vehicle via the respective perimeter frame portion 216a, 216b. Stated differently, the flashlight 232 may be charged by the vehicle power source (e.g., vehicle battery) while disposed within the recess 230 of the respective perimeter frame portion 216a, 216b. In such an application, electrical power may be provided to the glass panel assembly 210 via electrical connection to a vehicle wire harness when the roof assembly is mounted at the vehicle. Optionally, the flashlight (or other battery-powered accessory) may be charged when removed from the receptacle.

The glass roof panel comprises a transparent glass roof panel. The glass roof panel may comprise any suitable material, such as transparent glass or polycarbonate or the like. Optionally, and desirably, the glass roof panel may comprise a thin, strong glass material, such as GORILLA® Glass (commercially available from Corning Incorporated), which provides a lightweight and strong glass panel. Optionally, a ceramic frit layer or darkened layer or light absorbing layer or the like is disposed at the glass roof panel at locations where the perimeter frame portion is attached at, so that the frame portion is not viewable from exterior of the vehicle by a person viewing the glass roof panel of the vehicle from above the roof. The perimeter frame portion may be adhesively attached to the inner/lower side of the glass panel by utilizing aspects of the window assemblies described in U.S. Pat. Nos. 5,551,197 and 5,853,895, which are hereby incorporated herein by reference in their entireties. For example, the perimeter frame portion may be bonded to the glass roof panel using any suitable adhesive, such as a one component urethane adhesive, such as a moisture cured adhesive, such as BETASEAL™ or the like.

The glass roof panel assembly 110 provides a single glass panel that extends across the vehicle and that is removably or detachably attached at the vehicle roof via a plurality of latches. The glass roof panel assembly 210 provides dual glass panels that extend on either side of the vehicle and are removably or detachably attached to one another and at the vehicle roof via a plurality of latches. When attached at the vehicle, the side rails are located along side regions of the vehicle roof and extend above the driver-side and passenger-side front doors of the vehicle. The vehicle roof can thus be retrofitted with the glass roof panel without modification to the vehicle or vehicle roof.

Optionally, the roof panel assembly may utilize aspects of the window assemblies described in U.S. Pat. Nos. 8,915,018; 7,073,293; 7,003,916; 6,691,464; 6,026,611; 5,996,284 and/or 5,799,444, and/or U.S. Publication Nos. 2014-0047772; 2008-0127563; 2008-0106124; 2006-0107600; 2004-0020131 and/or 2003-0213179, which are hereby incorporated herein by reference in their entireties. Optionally, the glass roof panel may include one or more electrically conductive elements, such as heater grids or the like, which may be powered utilizing aspects of the window assemblies described in U.S. Pat. Nos. 8,881,458 and/or 8,402,695, which are hereby incorporated herein by reference in their entireties.

Referring now to FIGS. 20-26, a storage device or assembly or system 300 is depicted with a reinforcement member or retaining element or strap 350 attached to a frame 352 via an articulation portion or hinge 356 and a locking element or feature 354. The frame 352 may be attached at a vehicle bed and the retaining element 350 may pivot or move relative to the frame to allow for storage and removal of the glass roof panel assembly. The storage system 300 may be utilized with any one of the glass panel assemblies discussed herein to store the respective glass panel assembly in a bed of the vehicle in a storage position.

Figure 23:
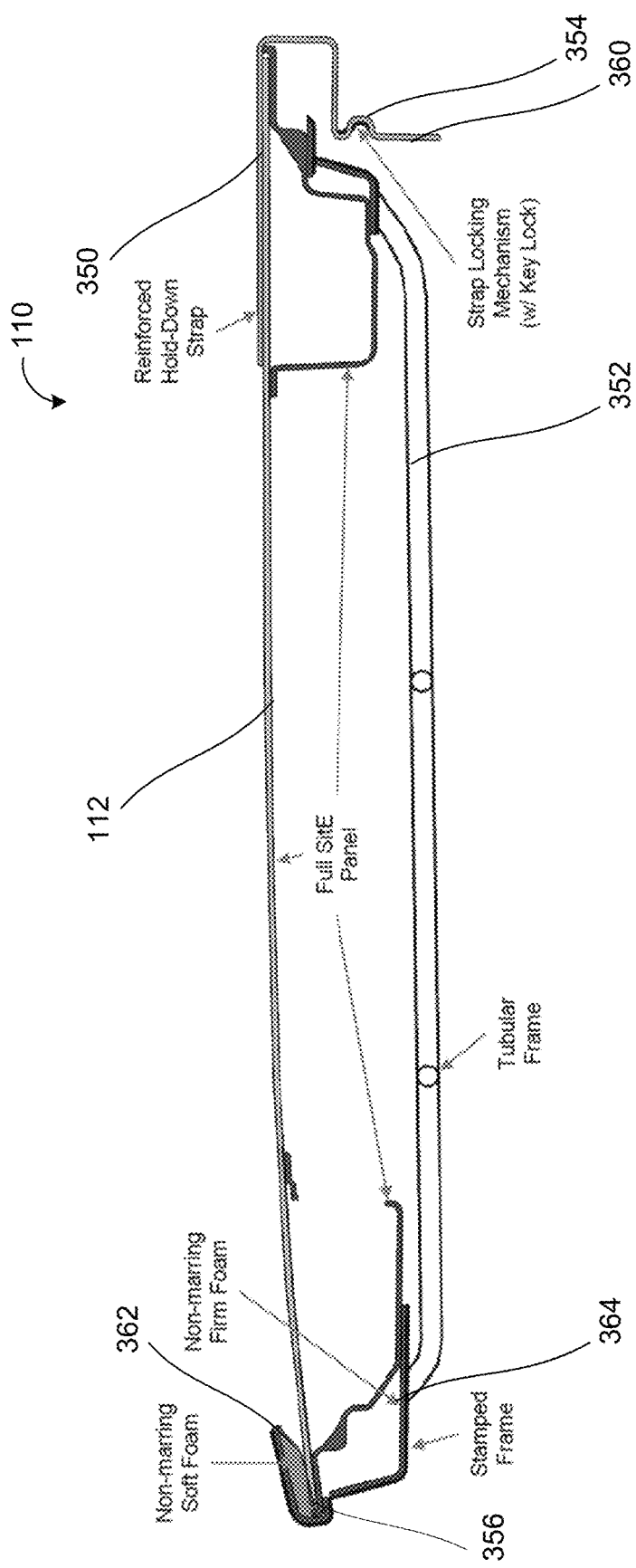
FIG. 23 is a sectional view of the storage device of FIG. 20.
Figure 24:
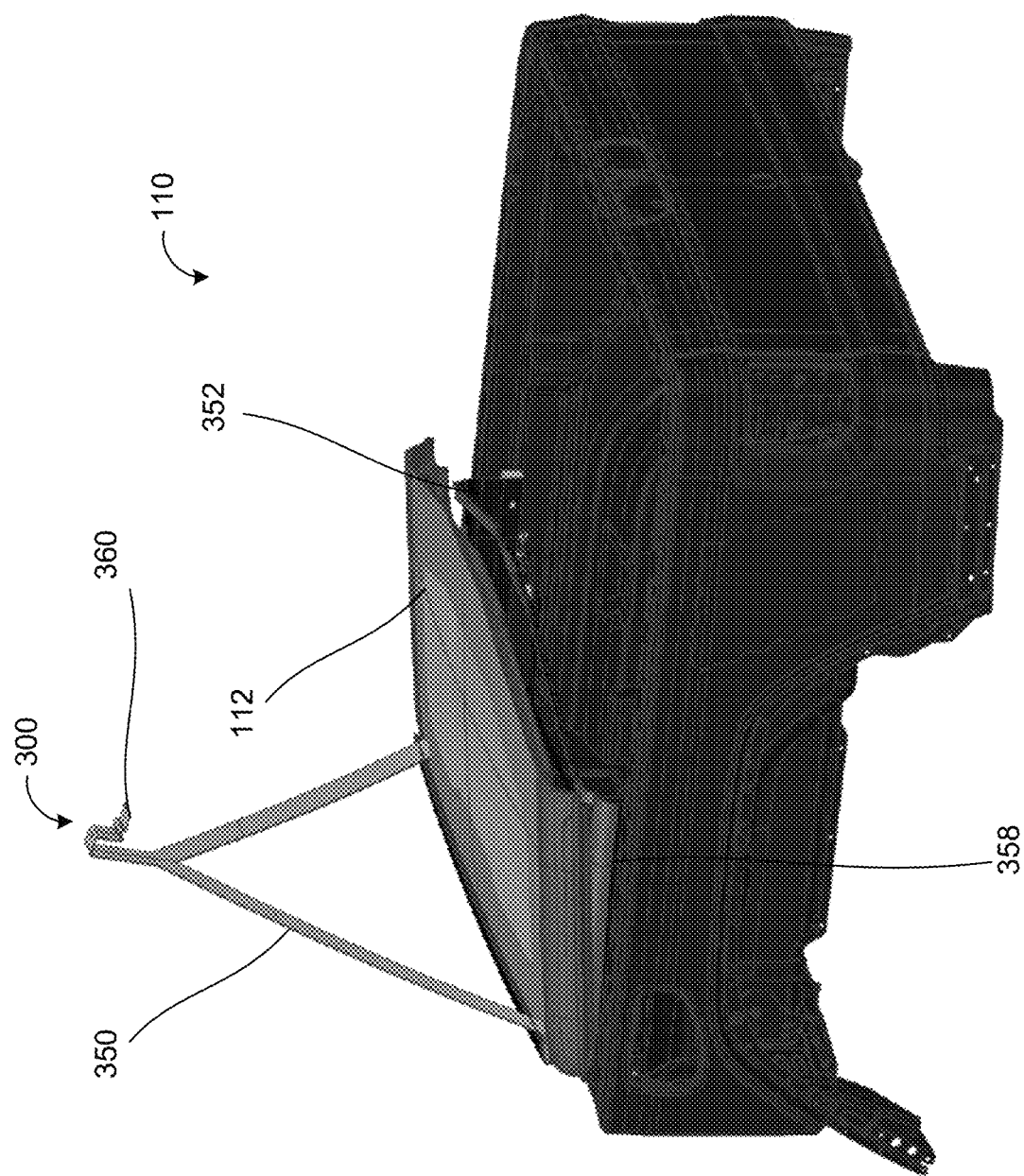
FIGS. 24 and 25 are perspective views of a storage device and glass roof panel assembly selectively secured by a reinforcement member.

The glass roof panel(s), when stored at the vehicle bed, are coupled to the frame 352 of the storage system 300 via the retaining element 350 to secure the glass panel(s) in a storage position. For example, the glass roof panel(s), when not in use at the roof of the vehicle, may be stored in a bed of the vehicle via the storage system 300 via the retaining element 350 extending across the glass roof panel(s) and preventing movement of the panel assembly when in the storage position. The storage system 300 includes the articulation portion or hinge 356 that allows the retaining element 350 to rotate about an axis relative to the frame 352. For example, the retaining element 350 is coupled to the articulation portion 356 to raise and lower the retaining element 350. Stated differently, the articulation portion 356 may articulate the retaining element 350 between a locked state (FIGS. 20-23 and 25) and an unlocked state or opened or raised state (FIGS. 24 and 26). The storage assembly 300 may be attached to the bed of the vehicle via attachment portions 358 to secure the storage assembly 300 in the bed, as described in more detail below.

Referring to FIGS. 21-25, the glass roof panel assembly (such as, for example, the glass roof panel assembly 110 or 210, discussed above) may be stored in a vehicle bed via the storage assembly 300, and the retaining element 350 is operably attached to the glass panel assembly. The retaining element 350 may be hingedly attached to the glass panel assembly and is pivotable between the locked state when the retaining element 350 is fixedly coupled to frame 352 to retain the glass panel assembly and the unlocked state when the retaining element 350 may be raised and lowered relative the glass panel assembly 110 to allow for removal or storage of the glass panel assembly, as described in more detail below. The glass roof panel assembly may be mounted at the bed of the vehicle via the frame 352 and retaining element 350 of the storage assembly 300.

In the illustrated embodiment, the frame 352 may comprise a plastic or metal frame that attaches to the vehicle bed via the attachment elements 358. The frame is configured to receive the glass roof panel thereat, and, with the glass roof panel received at the frame 352, the retaining element 350 can be lowered over the glass roof panel assembly and snap-attached or otherwise secured or retained or attached at the frame 352. As shown in FIG. 23, a pliable foam element or compressible element 362 (or other filler material) may be disposed at the frame 352 (at the pivoting end of the retaining element) so as to be disposed between the frame and the glass panels of the roof panel assembly when the panel assembly is received at the frame and when the retaining element is secured in the storage position (where the retaining element may latch or attach at the rearward part of the frame distal from the articulation portion 356). The frame 352 may also include a foam element 364 (such as a non-marring firm foam) that the glass window panel assembly rests on when the glass window panel is received at the frame portion. The foam elements engage the window panel assembly to retain the window assembly at the storage device without contacting the glass panels or the window frame portions with the plastic or metal frame or retaining element. The retaining element may also have a foam pad or non-marring surface that engages an upper surface of the glass panel assembly, or the retaining element may comprise a flexible fabric material that does not mar or scuff the glass panel assembly when the glass panel assembly is retained at the frame.

Referring now to FIGS. 20 and 22-24, a distal end or locking end 360 of the retaining element 350 may be coupled to the locking feature 354 of the storage assembly 300 via a lock (e.g., a key lock) or other latching mechanism to secure the glass roof panel 112 relative to the bed of the vehicle. The locking end 360 of the retaining element 350 includes a fastening portion 360 that extends around an edge of the glass roof panel 112 and is attached to the locking feature 354 of the frame 352 to secure the glass roof panel 112 at the storage device 300. The locking feature 354 secures the locking end 360 of the retaining element 350 with the frame 352. The glass roof panel 112 may be raised and lowered relative to the frame 352, such that when the retaining element 350 is unlocked from the frame 352, the glass roof panel 112 may be manipulated or otherwise detached from the storage assembly 300. The glass roof panel 112 may be secured at the frame 352 via the retaining element 350 to prevent unintentional movement of the glass roof panel 112. The distal end of the retaining element may have a foam pad or non-marring surface to avoid marring or scuffing the edge region of the glass panel assembly when the glass panel assembly is retained at the frame.

Figure 25:
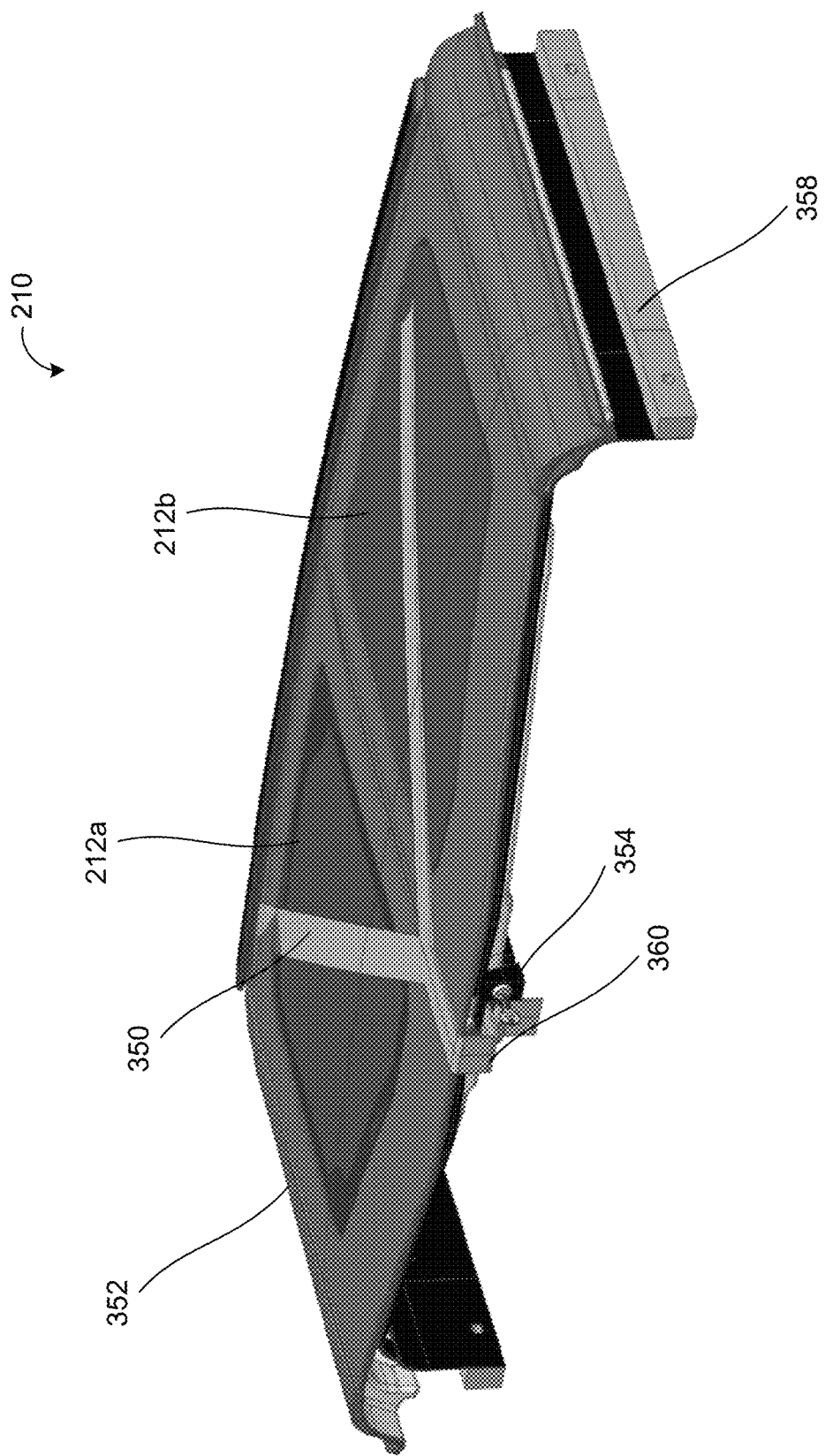
Figure 26:
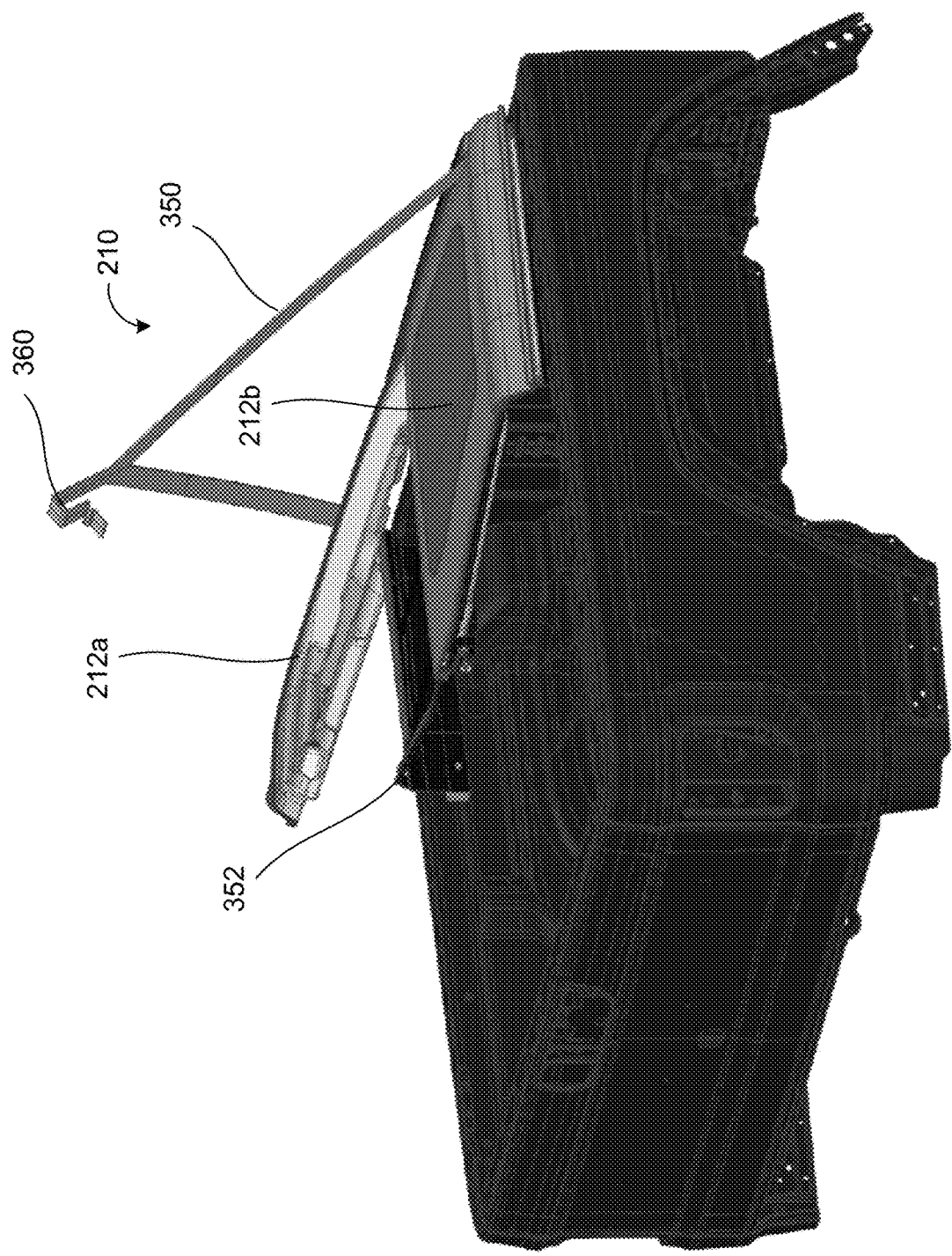
FIG. 26 is a perspective view of the storage device and glass roof panel assembly.

FIGS. 25 and 26 depict the retaining element 350 of the storage assembly 300 coupled to or overlapping the glass panel assembly 210. The retaining element 350 may be hingedly coupled to frame 352 and is movable or pivotable between a locked state where the retaining element 350 is fixedly retained at the glass panel assembly and an unlocked state where the retaining element 350 is raised or moved from the glass panel assembly 210, as described in more detail below.

Thus, the glass panel assembly is attached to the frame 352 of the storage assembly 300 and selectively secured by the retaining element 350. The locking feature 354 to which the retaining element 350 may be attached further secures the glass panel assembly in the locked state of the storage device. For example, the retaining element 350 may be coupled to the frame 352 via the locking feature 354 to secure the glass panel assembly relative the bed of the vehicle. The fastening portion 360 of the reinforcement member 350 extends around an edge of the glass panel assembly and is coupled to the locking feature 354 to secure the glass panel assembly at the vehicle bed. The fastening portion 360 of the retaining element 350 is secured with the locking feature 354 of the frame 352 to secure the glass panel assembly in the locked position when not in use. The glass panel assembly may be raised and lowered relative to the vehicle bed, such that when the retaining element 350 is unlocked from the frame 352, the glass panel assembly may be manipulated so as to be removed from the frame 352 and the vehicle bed. The frame 352 of the storage assembly 300 remains coupled to the bed of the vehicle via the attachment portions 358 while the glass panel assembly is raised and lowered.

The glass panel assembly may be attached to and detached from the storage assembly as a unit or the individual glass panels (e.g., glass panels 212*a*, 212*b*) of the glass panel assembly may be individually or separately attached to and detached from the storage assembly. For example, FIG. 25 illustrates the first glass panel 212*a* raised while the second panel 212*b* remains lowered. To raise either the first and/or second panels 212*a*, 212*b*, the retaining element 350 is unlocked and raised relative the panels 212*a*, 212*b* and the frame 352. To secure the glass roof panels 212*a*, 212*b*, the retaining element 350 is locked to the locking feature 354, which prevents movement of the glass roof panels 212*a*, 212*b*.

Figure 20:
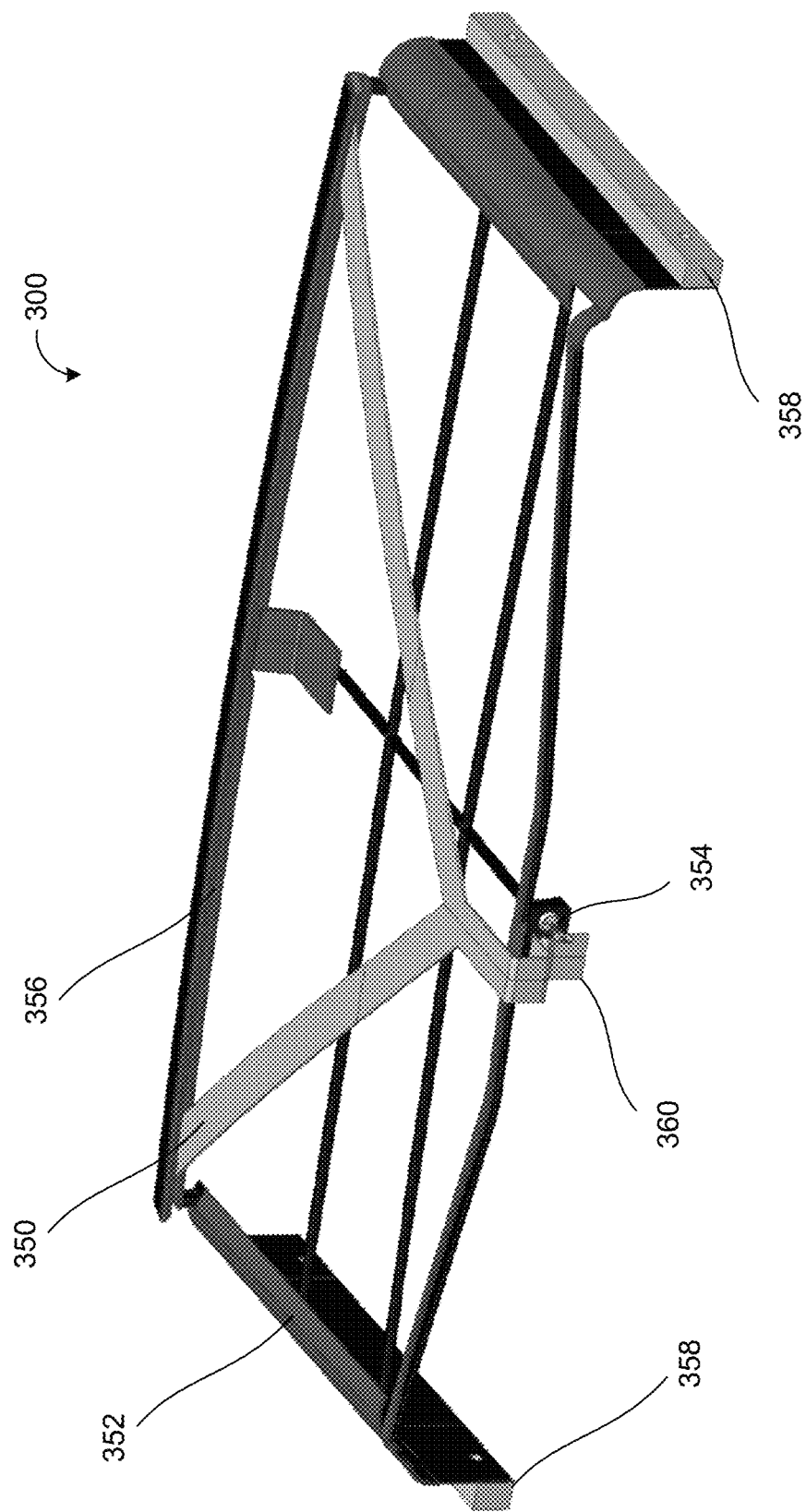
FIGS. 20 and 21 are perspective views of a storage assembly or device for storing a glass roof panel assembly.
Figure 21:
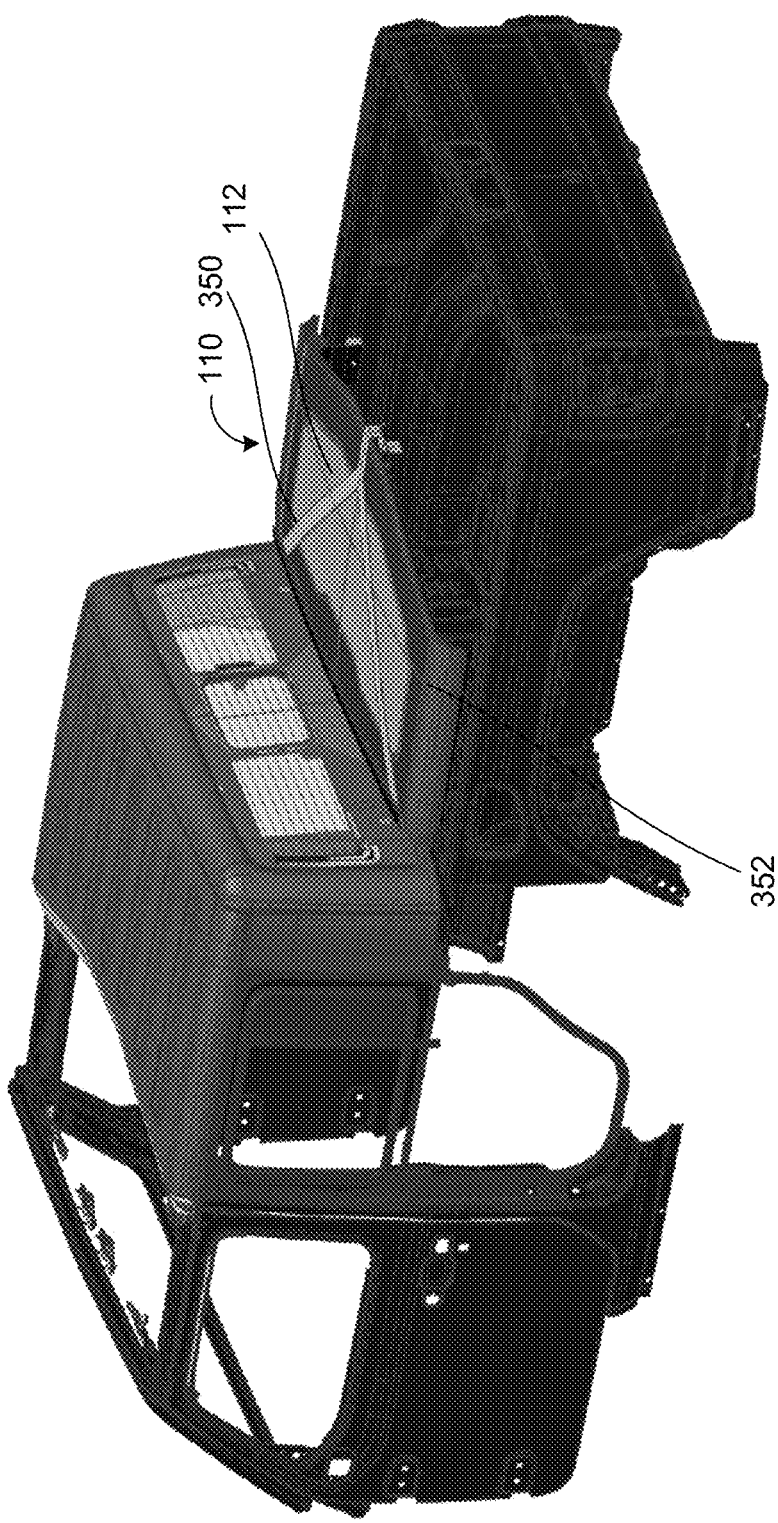
Figure 22:
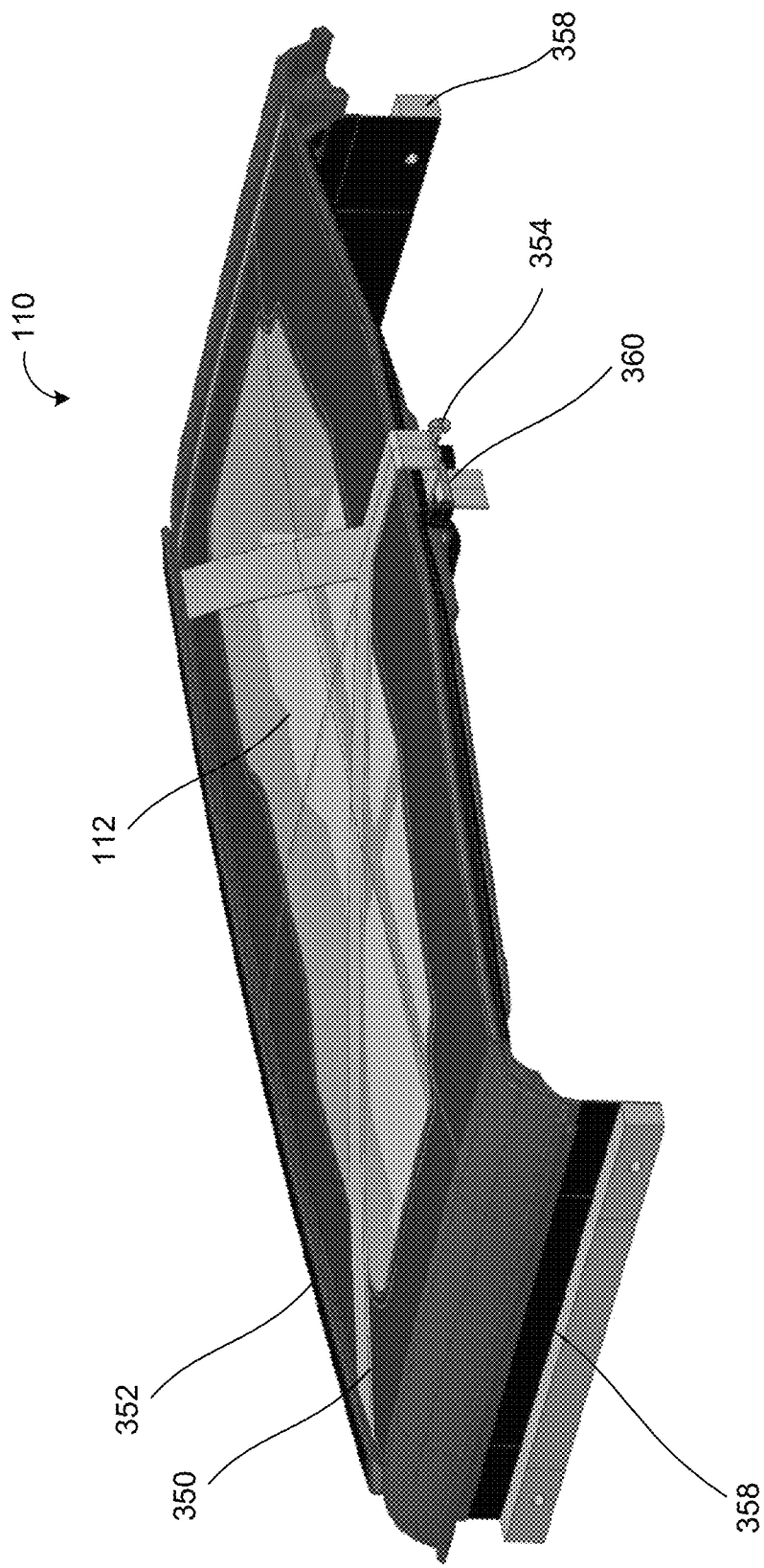
FIG. 22 is a cross-section view of the storage device and glass roof panel assembly of FIG. 21.
Figure 27:
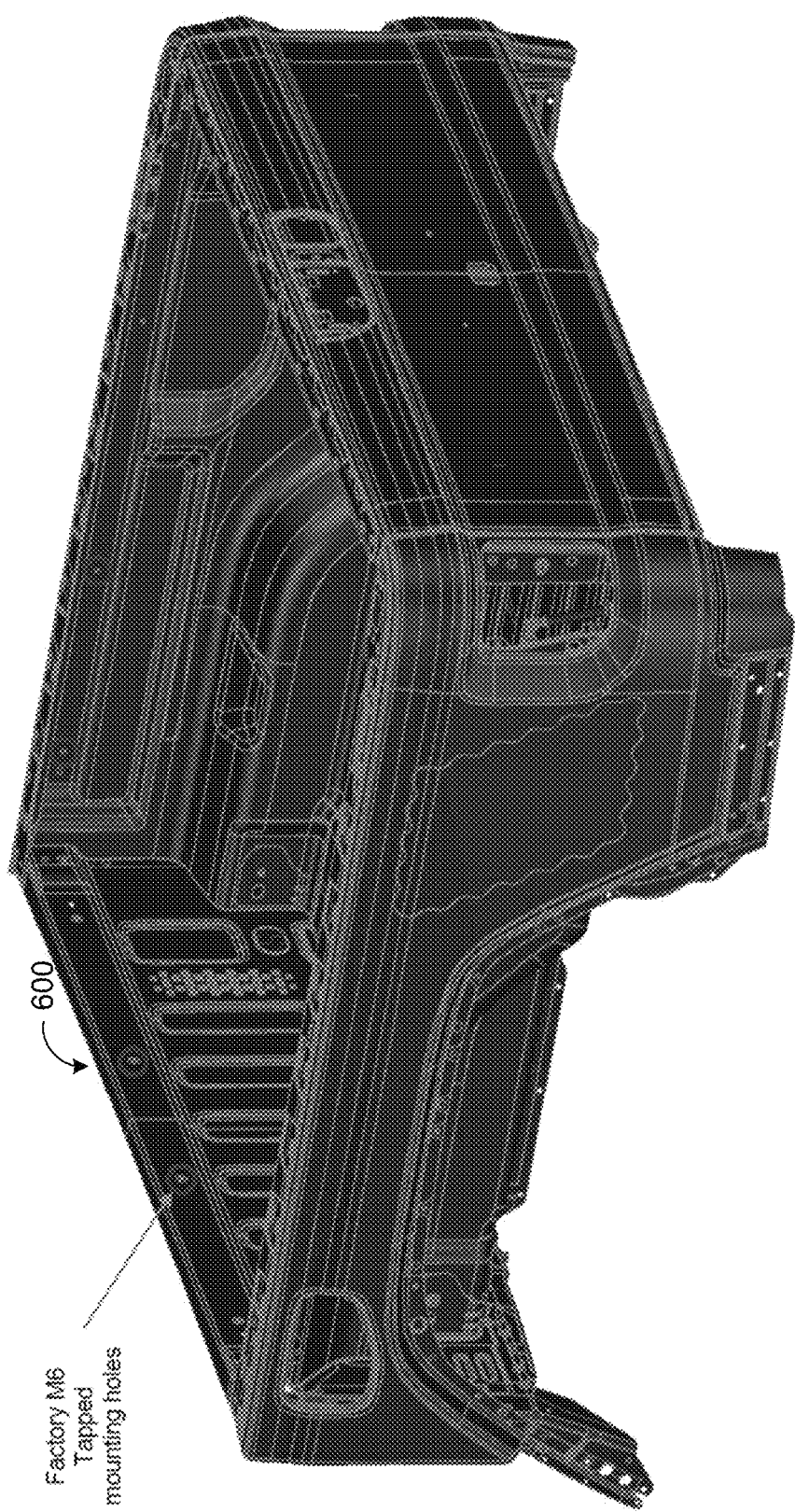
FIG. 27 is a perspective view of a vehicle bed with an attachment system suitable for mounting or attaching the storage device thereat.

As shown in FIGS. 20, 22, and 25, the frame 352 of the storage device 300 is configured to be fixedly attached at the vehicle bed via the attachment portions 358, which may be fastened or otherwise attached to attachment rails of the vehicle bed. For example, and with reference to FIGS. 26 and 27, various configurations of an attachment system are illustrated. FIG. 27 illustrates attachment locations 600 (e.g., factory tapped mounting holes) at which the attachment portions or mounting system described above may be coupled or fastened. Optionally, the attachment portions may be configured to attach to or mount at an attachment system of the vehicle. For example, the vehicle may include an optional factory installed T-nut attachment system having rails attached along the sidewalls of a truck bed with adjustable T-nuts adjustably disposed along the rails. Optionally, a similar aftermarket attachment system having a rail attached along the sidewalls of the truck bed with adjustable elements adjustably disposed along the rails may be implemented. For example, the frame 352 may be mounted along the sidewalls of the truck bed of the vehicle and with the glass roof panel assembly disposed at the storage device, such that the side rails of the glass roof panel assembly are disposed along an upper region of the sidewalls of the truck bed. Optionally, an attachment system may be implemented at the vehicle with brackets attached at the rails. The frame 352 of the storage system 300 may include brackets or attachment portions configured to fasten or snap-attach or otherwise attach to attachment systems or rails of various truck beds (e.g., to the T-nuts or adjustable elements or brackets at the rails of a vehicle attachment system). Thus, the storage system 300 may be configured to mount or attach at various vehicle bed configurations to detachably or removably retain any one of the glass panel assemblies discussed above at the vehicle bed.

The storage system 300 is thus configured to securely store the glass panel assemblies described herein in a storage position when the glass panel assembly is removed from the roof of the vehicle. The storage system 300 may be attached to the bed of the vehicle via a suitable attachment system to securely retain the respective glass panel assembly in the storage position in the respective vehicle bed. The retaining element 350 secures the glass roof panel assemblies by preventing movement of the glass roof panel(s) in the storage position. For example, the retaining element 350 is disposed over the glass roof panel(s) and is coupled to the perimeter frame to secure the glass roof panel(s) in the storage position.

Changes and modifications to the specifically described embodiments may be carried out without departing from the principles of the present invention, which is intended to be limited only by the scope of the appended claims, as interpreted according to the principles of patent law.

The invention claimed is:

1. A vehicular glass roof system comprising:
   a vehicular glass roof panel assembly comprising (i) a perimeter frame portion, (ii) a glass panel adhesively bonded to the perimeter frame portion, and (iii) side rails adhesively bonded along opposite side regions of the perimeter frame portion;
   wherein the perimeter frame portion comprises a plurality of latching elements configured to latch the vehicular glass roof panel assembly at a vehicle roof;
   wherein, with the latching elements latching the vehicular glass roof panel assembly at a vehicle roof, the glass panel extends across the vehicle roof and the side rails extend above respective side doors of the vehicle;
   a storage device for storing the vehicular glass roof panel assembly at a portion of the vehicle when the vehicular glass roof panel assembly is not attached at the vehicle roof;
   wherein the storage device comprises a frame coupled to the vehicle;
   wherein the storage device further comprises a retaining element adjustably mounted at the frame and adjustable between a raised unlocked state and a lowered locked state; and
   wherein, with the vehicular glass roof panel assembly disposed at the storage device, and with the retaining element in the lowered locked state, the retaining element is secured to the frame to retain the vehicular glass roof panel assembly at the storage device.

2. The vehicular glass roof system of claim 1, wherein the retaining element comprises (i) a hinge end that pivotally attaches at the frame and (ii) a distal end that secures via a locking element to the frame when the retaining element is in the lowered locked state.

3. The vehicular glass roof system of claim 2, wherein the frame is configured to support the vehicular glass roof panel assembly when the vehicular glass roof panel assembly is disposed at the storage device.

4. The vehicular glass roof system of claim 3, wherein, with the vehicular glass roof panel assembly disposed at the storage device and supported by the frame, the retaining element pivots downward over the vehicular glass roof panel assembly and secures via the locking element to the frame.

5. The vehicular glass roof system of claim 1, wherein the storage device includes a compressible element disposed between the frame and the vehicular glass roof panel assembly when the vehicular glass roof panel assembly is disposed at the storage device.

6. The vehicular glass roof system of claim 1, wherein the vehicle comprises a pickup truck and the frame of the storage device is configured to mount at a truck bed of the vehicle.

7. The vehicular glass roof system of claim 6, wherein the frame is configured to mount along sidewalls of the truck bed of the vehicle, and wherein, with the frame mounted along the sidewalls of the truck bed of the vehicle and with the vehicular glass roof panel assembly disposed at the storage device, the side rails of the vehicular glass roof panel assembly are disposed along an upper region of the sidewalls of the truck bed of the vehicle.

8. The vehicular glass roof system of claim 7, wherein the retaining element is hingedly attached at the frame and, when pivoted downward over the vehicular glass roof panel assembly disposed at the storage device at the truck bed of the vehicle, the retaining element secures to the frame to store the vehicular glass roof panel assembly at the truck bed of the vehicle so as to partially cover the truck bed of the vehicle.

\* \* \* \* \*